(12) United States Patent
Lou et al.

(10) Patent No.: US 11,588,536 B2
(45) Date of Patent: *Feb. 21, 2023

(54) SYSTEMS AND METHODS FOR BEAMFORMING TRAINING IN WIRELESS LOCAL AREA NETWORKS

(71) Applicant: InterDigital Patent Holdings, Inc., Wilmington, DE (US)

(72) Inventors: Hanqing Lou, Syosset, NY (US); Xiaofei Wang, North Caldwell, NJ (US); Oghenekome Oteri, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,631

(22) Filed: Apr. 27, 2022

(65) Prior Publication Data

US 2022/0255612 A1     Aug. 11, 2022

Related U.S. Application Data

(63) Continuation of application No. 17/343,264, filed on Jun. 9, 2021, now Pat. No. 11,349,551, which is a (Continued)

(51) Int. Cl.
*H04B 7/06* (2006.01)
*H04B 7/08* (2006.01)
(Continued)

(52) U.S. Cl.
CPC ......... *H04B 7/0695* (2013.01); *H04B 7/0684* (2013.01); *H04B 7/088* (2013.01); (Continued)

(58) Field of Classification Search
CPC .... H04B 7/0695; H04B 17/12; H04B 7/0851; H04B 7/0684; H04B 7/088; H04B 7/0413;
(Continued)

(56) References Cited

U.S. PATENT DOCUMENTS 8,374,154 B2   2/2013   Gong et al.
8,971,964 B2   3/2015   Hosoya et al.
(Continued)

FOREIGN PATENT DOCUMENTS

CN   104079334 A   10/2014
CN   104734759 A    6/2015
(Continued)

OTHER PUBLICATIONS

Agilent Technologies, "Wireless LAN at 60 GHz—IEEE 802.11ad Explained, Application Notes" published by Agilent Technologies, May 30, 2013, 28 pages.
(Continued)

*Primary Examiner* — Fitwi Y Hailegiorgis
(74) *Attorney, Agent, or Firm* — Majid Albassam

(57) ABSTRACT

Presently disclosed are systems and methods for beamforming training in WLANs. In various embodiments, there are unified MIMO beamforming training procedure, which includes a training period in which an initiator transmits multiple unified training frames for performing a transmit-beamforming training of the initiator and a receive-beamforming training of one or more responders; a feedback period in which each responder replies with a beamforming-feedback response; and an acknowledgement period during which the initiator transmits respective acknowledgement frames to the one or more responders from which responses were received. Rules for restricted random access in various slots of the feedback period may be implemented, to address response contention between multiple qualifying responders.

18 Claims, 12 Drawing Sheets

Related U.S. Application Data continuation of application No. 16/826,512, filed on Mar. 23, 2020, now Pat. No. 11,082,114, which is a continuation of application No. 16/081,838, filed as application No. PCT/US2017/021645 on Mar. 9, 2017, now Pat. No. 10,608,726.

(60) Provisional application No. 62/335,518, filed on May 12, 2016, provisional application No. 62/306,619, filed on Mar. 10, 2016.

(51) Int. Cl.
*H04B 17/12* (2015.01)
*H04W 72/0446* (2023.01)
*H04W 74/00* (2009.01)
*H04B 7/0413* (2017.01)
*H04W 72/044* (2023.01)

(52) U.S. Cl.
CPC .......... *H04B 7/0851* (2013.01); *H04B 17/12* (2015.01); *H04W 72/0446* (2013.01); *H04B 7/0413* (2013.01); *H04W 72/046* (2013.01); *H04W 74/00* (2013.01)

(58) Field of Classification Search
CPC .......... H04W 72/0446; H04W 72/046; H04W 74/00
USPC ...................................................... 375/262
See application file for complete search history.

(56) References Cited

U.S. PATENT DOCUMENTS

| | | | |
|---|---|---|---|
| 10,321,484 | B2 | 6/2019 | Lou et al. |
| 10,608,726 | B2 | 3/2020 | Lou et al. |
| 11,082,114 | B2 | 8/2021 | Lou et al. |
| 2009/0238156 | A1 | 9/2009 | Yong et al. |
| 2011/0128929 | A1 | 6/2011 | Liu et al. |
| 2012/0122392 | A1 | 5/2012 | Morioka et al. |
| 2014/0292577 | A1 | 10/2014 | Hosoya et al. |
| 2014/0307654 | A1* | 10/2014 | Kim .................... H04B 7/0617 370/329 |
| 2015/0092710 | A1 | 4/2015 | Novlan et al. |
| 2015/0244432 | A1 | 8/2015 | Wang |
| 2015/0289147 | A1 | 10/2015 | Lou et al. |
| 2015/0365973 | A1 | 12/2015 | Choi et al. |
| 2015/0382171 | A1 | 12/2015 | Roy et al. |
| 2017/0033851 | A1 | 2/2017 | Zhong et al. |
| 2021/0306057 | A1 | 9/2021 | Lou et al. |

FOREIGN PATENT DOCUMENTS

| | | | |
|---|---|---|---|
| CN | 105052235 | A | 11/2015 |
| EP | 2966789 | A1 | 1/2016 |
| JP | 2014532320 | A | 12/2014 |
| KR | 20100107066 | A | 10/2010 |
| KR | 20150115931 | A | 10/2015 |
| KR | 20150138169 | A | 12/2015 |
| TW | 201503735 | A | 9/2018 |
| WO | WO 2010099040 | A1 | 9/2010 |
| WO | WO 2011043901 | A2 | 4/2011 |
| WO | WO 2011055535 | A1 | 5/2011 |
| WO | WO 2013036021 | A2 | 3/2013 |
| WO | WO 2017065554 | A1 | 4/2017 |

OTHER PUBLICATIONS

"Draft Standard for Information Technology—Telecommunications and Information Exchange Between Systems Local and Metropolitan Area Networks—Specific Requirements—Part 11: Wireless LAN Medium Access Control—(MAC) and Physical Layer (PHY) Specifications, Amendment 2: Sub 1 GHz License Exempt Operation", IEEE P802.11ah/D7.0 (Amendment to IEEE Std 802.11REVmc/D5.0) Mar. 2016, 650 pages.

"IEEE Standard for Information technology—Telecommunications and information exchange between systems. Local and metropolitan area networks—Specific requirement. Part 11: Wireless LAN Medium Access Control (MAC) and Physical Layer (PHY) Specifications", IEEE Std 802.11-2016 (Revision of IEEE Std 802.11-2012), Dec. 7, 2016, 3534 pages.

"IEEE Standard for Information Technology—Telecommunications and information exchange between systems, Local and metropolitan area networks—Specific requirements, Part 11: Wireless LAN Medium Access Control (MAC) and Physical Layer (PHY) Specifications, Amendment 2: Sub 1 GHz License Exempt Operation", IEEE Std 802.11ah-2016 (Amendment to IEEE Std 802.11-2016 as amended by IEEE Std 802.11ai-2016), Dec. 7, 2016, 594 pages.

"Part 11: Wireless LAN Medium Access Control (MAC) and Physical Layer (PHY) Specifications", IEEE Standards Association; 802.11-2012, Mar. 29, 2012, 2793 pages.

"IEEE Standard for Information technology—Telecommunications and information exchange between systems. Local and metropolitan area networks—Specific requirement, Part 11: Wireless LAN Medium Access Control (MAC) and Physical Layer (PHY) Specifications, Amendment 3: Enhancements for Very High Throughput in the 60 GHz Band", IEEE Standards Association; 802.11ad-2012, Dec. 28, 2012, 628 pages.

Wang, James et al, "Scalable Beamforming for 11ay", IEEE 802.11-16/0099r0, Jan. 18, 2016, 12 pages.

"Notification of Transmittal of the International Search Report and the Written Opinion of the International Searching Authority, or the Declaration", PCT Application No. PCT/US2017/021645, dated Jun. 7, 2017, 22 pages.

Technicolor, MAC and PHY Proposal for 802.11af, IEEE Standard 802.11-10/0258r0, Mar. 2010, 23 pages.

"Written Opinion of the International Preliminary Examining Authority", PCT Application No. PCT/US2017/021645, dated Feb. 19, 2018, 12 pages.

"IEEE Standard for Information Technology—Telecommunications and Information Exchange Between Systems—Local and Metropolitan Area Networks—Specific Requirement, Part 11: Wireless LAN Medium Access Control (MAC) and Physical Layer (PHY) Specifications, Amendment 8: Medium Access Control (MAC) Quality of Service Enhancements", IEEE Std. 802.11e-2005, Nov. 11, 2005, 210 pages.

"IEEE Standard for Information Technology—Telecommunications and information exchange between systems—Local and metropolitan area networks—Specific requirements, Part 11: Wireless LAN Medium Access Control (MAC) and Physical Layer (PHY) Specifications Amendment 5: Television White Spaces (TVWS) Operation", IEEE Standards Association; 802.11af-2013, Dec. 11, 2013, 198 pages.

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz", IEEE Standards Association; 802.11ac-2013, Dec. 11, 2013, 425 pages.

"Draft Standard for Information Technology—Telecommunications and Information Exchange Between Systems—Local and Metropolitan Area Networks. Specific Requirements. Part 11: Wireless LAN Medium Access Control (MAC) and Physical Layer (PHY) Specifications, Amendment 7: Enhanced throughput for operation in license-exempt bands above 45 GHz", P802.11ay/D0.1, Jan. 2017, 181 pages.

"Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 2: Enhanced throughput for operation in license-exempt bands above 45 GHz", IEEE P802.11ay/D4.0 (amend-

(56) References Cited

OTHER PUBLICATIONS ment to IEEE P802.11REVmdTM/D2.2 as amended by IEEE P802.11ax/D4.1), Jun. 2019, 791 pages.
"IEEE 802.11 TGay Use Cases", IEEE 802.11-2015/0625r2, May 2015, 21 pages.
Dave Halasz, "Sub 1 GHz license-exempt PAR and 5C", IEEE 802.11-10/0001r13, Jul. 2010, 7 pages.
"International Preliminary Report on Patentability", PCT Application No. PCT/US2017/021645, dated Jun. 18, 2018, 21 pages.

\* cited by examiner

FIG. 4A

SSW-FEEDBACK-FIELD FORMAT
(WHEN TRANSMITTED AS PART OF AN ISS)

| [B0] TOTAL SECTORS IN ISS | [B8]:[B9] NUMBER OF RX DMG ANTENNAS | [B10]:[B15] RESERVED | [B16] POLL REQUIRED | [B17] [B23] RESERVED |
|---|---|---|---|---|
| 9 | 2 | 5 | 1 | 7 |

OF BITS:

FIG. 4B

SSW-FEEDBACK-FIELD FORMAT
(WHEN NOT TRANSMITTED AS PART OF AN ISS)

| [B0] SECTOR SELECT | [B5]:[B6] DMG ANTENNA SELECT | [B7]:[B8] SNR REPORT | [B15] [B16] POLL REQUIRED | [B17] [B23] RESERVED |
|---|---|---|---|---|
| 6 | 2 | 8 | 1 | 7 |

OF BITS:

SYSTEMS AND METHODS FOR BEAMFORMING TRAINING IN WIRELESS LOCAL AREA NETWORKS

CROSS-REFERENCE TO RELATED APPLICATIONS

The present application is a continuation of U.S. patent application Ser. No. 17/343,264, filed Jun. 9, 2021, which is a continuation of U.S. patent application Ser. No. 16/826,512, filed Mar. 23, 2020 and now issued as U.S. Pat. No. 11,082,114, which is a continuation of U.S. patent application Ser. No. 16/081,838, filed Aug. 31, 2018 and now issued as U.S. Pat. No. 10,608,726, which is a national stage application under 35 U.S.C. 371 of International Application No. PCT/US2017/021645, entitled "SYSTEMS AND METHODS FOR BEAMFORMING TRAINING IN WIRELESS LOCAL AREA NETWORKS", filed on Mar. 9, 2017, which claims benefit under 35 U.S.C. § 119(c) from, U.S. Provisional Patent Application Ser. No. 62/306,619, filed Mar. 10, 2016, entitled "SYSTEMS AND METHODS FOR BEAMFORMING TRAINING IN WIRELESS LOCAL AREA NETWORKS," and U.S. Provisional Patent Application Ser. No. 62/335,518, filed May 12, 2016, entitled "SYSTEMS AND METHODS FOR BEAMFORMING TRAINING IN WIRELESS LOCAL AREA NETWORKS," the contents of each of which are incorporated herein by reference in their entirety.

TECHNICAL FIELD

This disclosure relates to systems and methods for beamforming training in wireless local area networks (WLANs), such as Institute of Electrical and Electronics Engineers (IEEE) 802.11ay WLANs.

BACKGROUND

Countless devices and networks around the globe operate according to one or more IEEE 802.11 standards for engaging in wireless communications. These communications typically occur in the 2.4-GHz and 5-GHz bands, though other bands are used as well.

Overview of Disclosed Embodiments

Presently disclosed are systems and methods for beamforming training in WLANs.

One embodiment takes the form of a method comprising a responder device receiving, from an initiator device, a message frame containing scheduling information that announces a training period and a feedback period for MIMO beamforming training; the responder device receiving, from the initiator device, at least one training frame during the announced training period; the responder device transmitting a beamforming-feedback response to the initiator device during the announced feedback period, the beamforming-feedback response identifying a preferred beam for the responder device; and the responder device receiving at least one acknowledgment frame from the initiator device.

One embodiment takes the form of a method comprising a responder device receiving, from an initiator device, a message frame containing scheduling information that announces a training period and a feedback period for MIMO beamforming training; the responder device receiving, from the initiator device, at least one training frame during the announced training period, each of the at least one training frame having a plurality of training sequences appended to an end of said training frame, wherein the number of training sequences is representative of a number of receive beams of the responder to be trained; the responder device, for each of the at least one training frames, sequentially receiving on each of a plurality of receive beams during the appended training sequences; the responder device determining a best receive beam of its plurality of receive beams trained in the training period; the responder device transmitting a beamforming-feedback response to the initiator device during one of a plurality of feedback period time slots associated with the receive beams of the initiator device in the announced feedback period, the beamforming-feedback response transmitted on a transmit beam associated with the best receive beam of the responder device and respective transmit beam of the initiator device; and the responder device receiving at least one acknowledgment frame from the initiator device.

One embodiment takes the form of a method comprising an initiator device transmitting, to a plurality of responder devices, a message frame containing scheduling information that announces a training period and a feedback period for MIMO beamforming training; the initiator device transmitting, to the plurality of responder devices, a plurality of training frames, each frame sequentially transmitted using a respective beam, during the announced training period, and each of the training frames having a plurality of training sequences appended to an end of said training frame, wherein the number of training sequences is representative of a number of receive beams of the initiator to be trained; the initiator device sequentially receiving beamforming-feedback responses on the receive beams of the initiator to be trained, said responses received from at least a subset of the plurality of responder devices during the announced feedback period; and the initiator device transmitting, responsive to the received beamforming-feedback responses, one or more acknowledgement frames to the subset of the plurality of responder devices.

One embodiment takes the form of a method comprising an initiator device transmitting, to a plurality of responder devices, a message frame containing scheduling information that announces a training period and a feedback period for MIMO beamforming training; the initiator device transmitting, to the plurality of responder devices, a plurality of training frames, each frame transmitted using a respective beam, during the announced training period; the initiator device receiving beamforming-feedback responses from at least a subset of the plurality of responder devices during the announced feedback period; and the initiator device transmitting, responsive to the received beamforming-feedback responses, one or more acknowledgement frames to the subset of the plurality of responder devices.

Another embodiment takes the form of an initiator device comprising a wireless-communication interface; a processor; and data storage containing instructions executable by the processor for causing the initiator device to carry out at least the functions listed in the preceding paragraph.

Another embodiment takes the form of a unified MIMO beamforming training procedure, which includes a training period in which an initiator transmits multiple unified training frames for performing a transmit-beamforming training of the initiator and a receive-beamforming training of one or more responders; a training-feedback period in which each responder replies with a training-feedback frames; and an acknowledgement period during which the initiator transmits respective acknowledgement frames to the one or more responders.

Moreover, any of the variations and permutations described in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

BRIEF DESCRIPTION OF THE DRAWINGS

FIG. 4A depicts a first example SSW-feedback-field format, in accordance with at least one embodiment.

FIG. 4B depicts a second example SSW-feedback-field format, in accordance with at least one embodiment.

Figure 1:
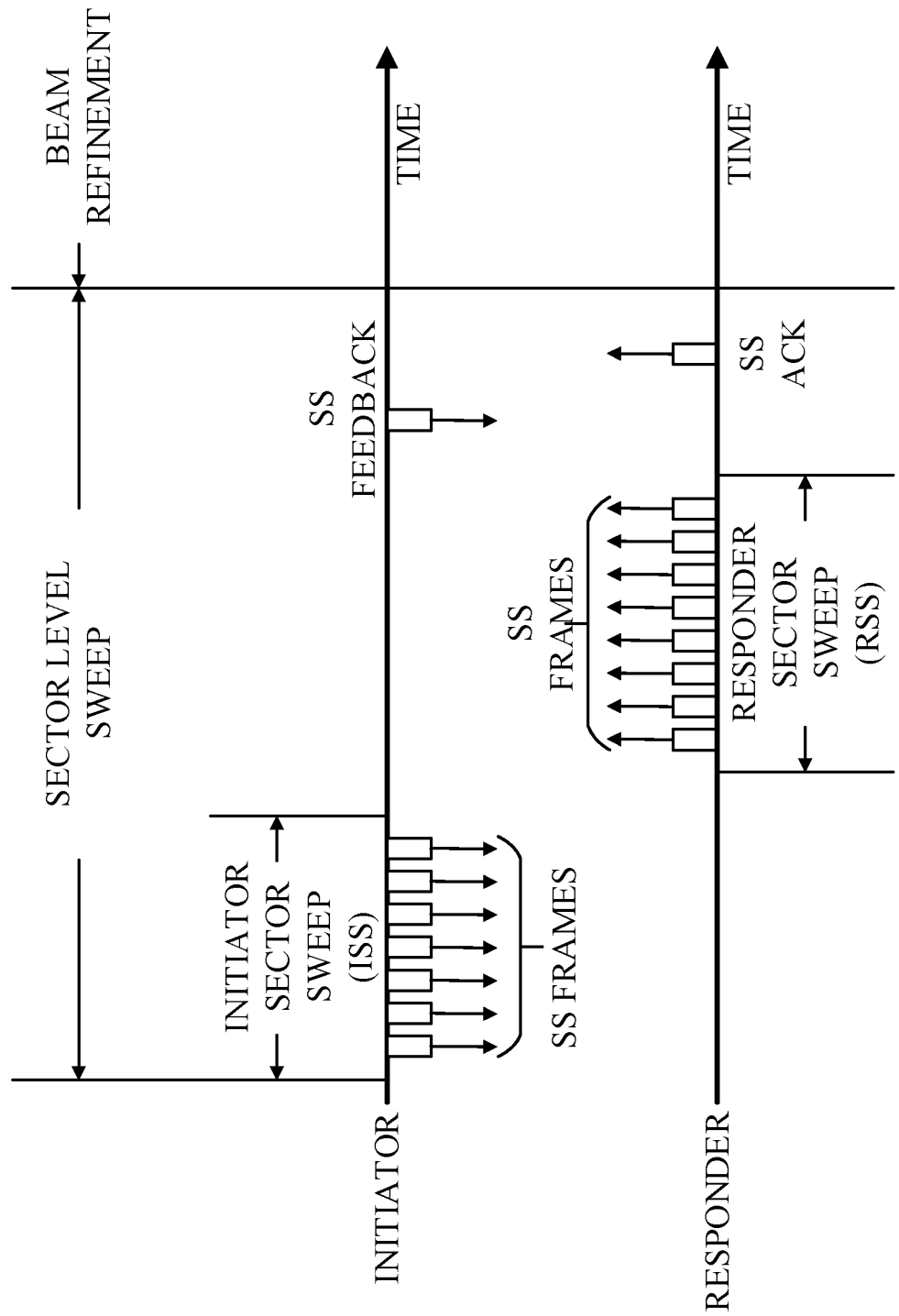
FIG. 1 depicts an example sector level sweep (SLS) training procedure, in accordance with at least one embodiment.

Moreover, before proceeding with this disclosure, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . ." And it is for reasons akin to brevity and clarity of presentation that this implied leading clause is not repeated ad nauseum in the below detailed description of the drawings.

DETAILED DESCRIPTION

Overview of WLAN. A WLAN in Infrastructure Basic Service Set (BSS) mode has an Access Point/Personal BSS (PBSS) Control Point (AP/PCP) for the BSS and one or more stations (STAs) (e.g., client devices) associated with the AP/PCP. The AP/PCP typically has access or interface to a Distribution System (DS) or another type of wired/wireless network that carries traffic in and out of the BSS. Traffic to STAs that originates from outside the BSS arrives through the AP/PCP and is delivered to the STAs. Traffic originating from STAs to destinations outside the BSS is sent to the AP/PCP to be delivered to the respective destinations. Traffic between STAs within the BSS may also be sent through the AP/PCP where the source STA sends traffic to the AP/PCP and the AP/PCP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP, and compatible devices simply communicate directly with each other. This mode of communication is referred to as an "ad-hoc" mode of communication.

Using the 802.11ac infrastructure mode of operation, the AP/PCP may transmit a beacon on a fixed channel, usually the primary channel. This channel may be 20 megahertz (MHz) wide, and is the operating channel of the BSS. This channel is also used by the STAs to establish a connection with the AP/PCP. The fundamental channel-access mechanism in an 802.11 system is Carrier Sense Multiple Access with Collision Avoidance (CSMA/CA). In this mode of operation, every STA, including the AP/PCP, will sense the primary channel. If the channel is detected to be busy, the STA backs off. Hence only one STA may transmit at any given time in a given BSS.

In 802.11n (as discussed in IEEE Std 802.11™-2012: Wireless LAN Medium Access Control (MAC) and Physical Layer (PHY) Specifications), High Throughput (HT) STAs may also use a 40-MHz-wide channel for communication. This is achieved by combining the primary 20-MHz-wide channel with an adjacent 20-MHz-wide channel to form a 40-MHz-wide contiguous channel.

In 802.11ac (as discussed in IEEE Std 802.11ad™-2012: Part 11: Wireless LAN Medium Access Control (MAC) and Physical Layer (PHY) Specifications Amendment 3: Enhancements for Very High Throughput in the 60 GHz Band), Very High Throughput (VHT) STAs may support 20-MHz-wide, 40-MHz-wide, 80-MHz-wide, and 160-MHz-wide channels. The 40-MHz-wide channels and the 80-MHz-wide channels are formed by combining contiguous 20-MHz-wide channels in a manner that is similar to what is described above in connection with 802.11n. A 160-MHz-wide channel may be formed either by combining 8 contiguous 20-MHz-wide channels, or by combining 2 non-contiguous 80-MHz-wide channels in what is also referred to at times as an "80+80 configuration." For the 80+80 configuration, the data, after channel encoding, is passed through a segment parser that divides it into two streams. Inverse Fast Fourier Transform (IFFT) processing and time-domain processing are performed on each stream separately. The streams are then mapped on to the two channels, and the data is transmitted. At the receiver, this mechanism is reversed, and the combined data is delivered to the MAC of the receiver.

Sub-1-gigahertz (GHz) modes of operation are supported by 802.11af (as discussed in IEEE P802.11ac™/D1.0: Part 11, Wireless LAN Medium Access Control (MAC) and Physical Layer (PHY) specifications. Amendment 5: Enhancements for Very High Throughput for Operation in Bands below 6 GHz) and 802.11ah (as discussed in IEEE 802.11-10/0258r0, MAC and PHY Proposal for 802.11af, March 2010.). (see also IEEE 802.11-10/0001r13, Sub 1 GHz license-exempt PAR and 5C, July 2010.) For these specifications, the channel operating bandwidths, as well as the carriers, are reduced relative to those used in 802.11n and 802.11ac. 802.11af supports 5-MHz, 10-MHz, and 20-MHz bandwidths in the TV White Space (TVWS) spectrum, and 802.11ah supports 1-MHz, 2-MHz, 4-MHz, 8-MHz, and 16-MHz bandwidths using non-TVWS spectrum. A possible use case for 802.11ah is support for Meter Type Control (MTC) devices in a macro coverage area. MTC devices may have limited capabilities including only support for only limited bandwidths, but also include a requirement for a very long battery life.

WLAN systems—such as 802.11n, 802.11ac, 802.11af, and 802.11ah—that support multiple channels and multiple channel widths include a channel that is designated as the primary channel. The primary channel may, but does not necessarily, have a bandwidth equal to the largest common operating bandwidth supported by all STAs in the BSS. The bandwidth of the primary channel is therefore limited by the STA (among the STAs that are operating in a BSS) that supports the smallest bandwidth operating mode (as the maximum supported channel-bandwidth operating mode for the particular STA). In the example of 802.11ah, the primary channel may be 1 MHz wide if there are STAs (e.g. MTC-type devices) that only support a 1-MHz mode even if the AP/PCP and other STAs in the BSS support, e.g., a 2-MHz, a 4-MHz, an 8-MHz, a 16-MHz, and/or one or more other channel-bandwidth operating modes in excess of the 1-MHz channel-bandwidth operating mode. All carrier sensing, as well as NAV settings, depend on the status of the primary channel; i.e., if the primary channel is busy, for example, due to a STA that supports only a 1-MHz operating mode currently transmitting to the AP, then the entire available frequency bands are considered busy even though majority of it stays idle and available.

In the United States, the available frequency bands that can be used for 802.11ah are from 902 MHz to 928 MHz. In Korea, it is from 917.5 MHz to 923.5 MHz; and in Japan, it is from 916.5 MHz to 927.5 MHz. The total bandwidth available for 802.11ah is between 6 and 26 MHz depending on the country code.

To improve spectral efficiency, 802.11ac has introduced the concept of downlink (DL) multi-user (MU) multiple-in-multiple-out (MIMO) (MU-MIMO) transmission to multiple STAs in the same symbol's time frame, e.g. during a downlink OFDM symbol. The potential for the use of downlink MU-MIMO is also currently considered for 802.11ah. One may note that since downlink MU-MIMO, as it is used in 802.11ac, uses the same symbol timing to multiple STAs, interference of the waveform transmissions to multiple STAs is not an issue. However, all STAs involved in MU-MIMO transmission with the AP/PCP must use the same channel or band, which limits the operating bandwidth to the smallest channel bandwidth that is supported by the STAs that are included in the MU-MIMO transmission with the AP/PCP.

802.11ad. 802.11ad is an amendment to the WLAN standard, which specifies the MAC and PHY layers for very high throughput (VHT) in the 60 GHz band.

802.11ad has the following features:
1. 802.11ad supports data rates up to 7 gigabits (Gbits) per second (s) (Gbits/s).
2. 802.11ad supports three different modulation modes:
   a. Control PHY with single carrier and spread spectrum;
   b. Single Carrier PHY; and
   c. OFDM PHY.
3. 802.11ad uses the 60-gigahertz (GHz) unlicensed band, which is available globally. At 60 GHz, the wavelength is 5 millimeters (mm), which makes compact antennas and antenna arrays possible. Such an antenna can create narrow radio-frequency (RF) beams at both the transmitter and the receiver, which effectively increases the coverage range and reduces interference.
4. 802.11ad has a frame structure that facilitates a mechanism for beamforming training (discovery and tracking). The beamforming training protocol includes two components: a sector level sweep (SLS) procedure and a beam refinement protocol (BRP) procedure. The SLS procedure is used for transmit beamforming training; the BRP procedure enables receive beamforming training as well as iterative refinement of both the transmit and receive beams.

MIMO transmissions, including both single-user-(SU)-MIMO and MU-MIMO, are not supported by 802.11ad.

Sector Level Sweep (SLS). An example SLS training procedure is shown in FIG. 1.

Figure 2:
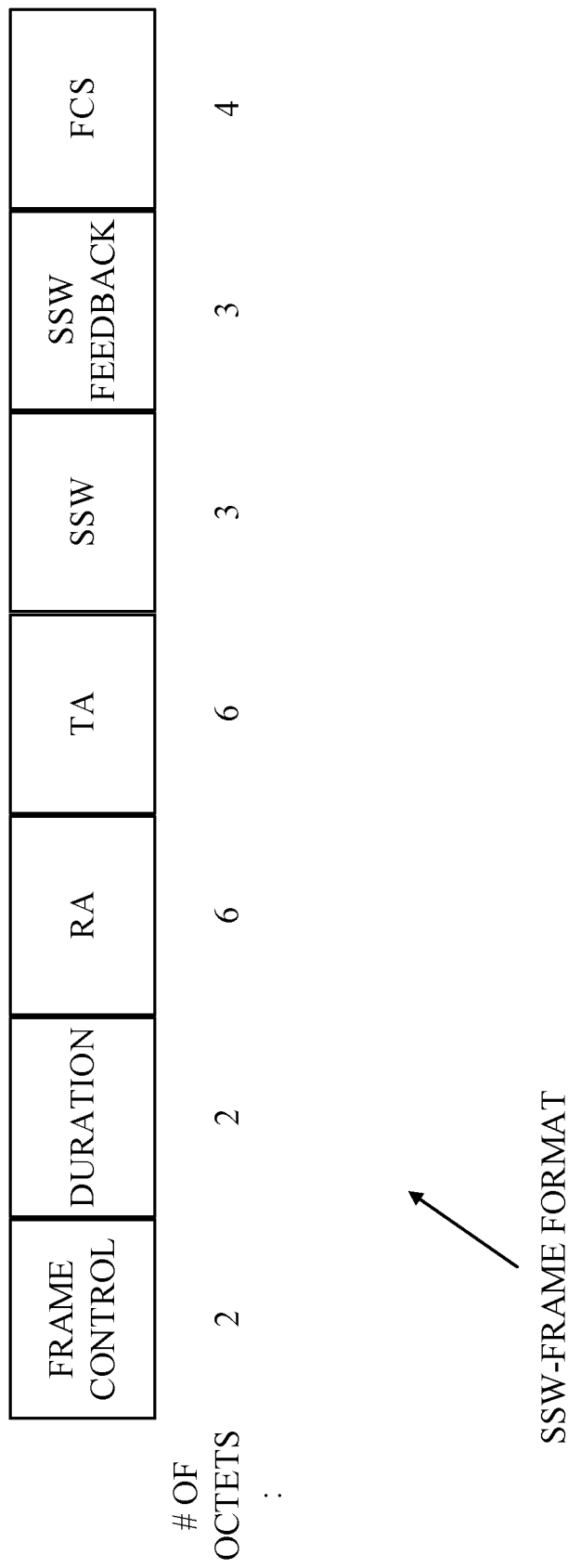
FIG. 2 depicts an example sector sweep (SSW) frame format, in accordance with at least one embodiment.

SLS training may be performed using Beacon frame or SSW frame. When Beacon frame is utilized, the AP/PCP repeats the Beacon frame with multiple beams/sectors within each Beacon interval (BI) and multiple STAs can perform BF training simultaneously. However, due to the size of Beacon frame, it is no guarantee that the AP/PCP can sweep all the sectors/beams within one BI. Thus a STA may need to wait multiple BIs to complete ISS training, and latency may be an issue. A SSW frame may be utilized for point to point BF training. A SSW frame may be transmitted using control PHY and the frame format is shown in FIG. 2.

Figure 3:
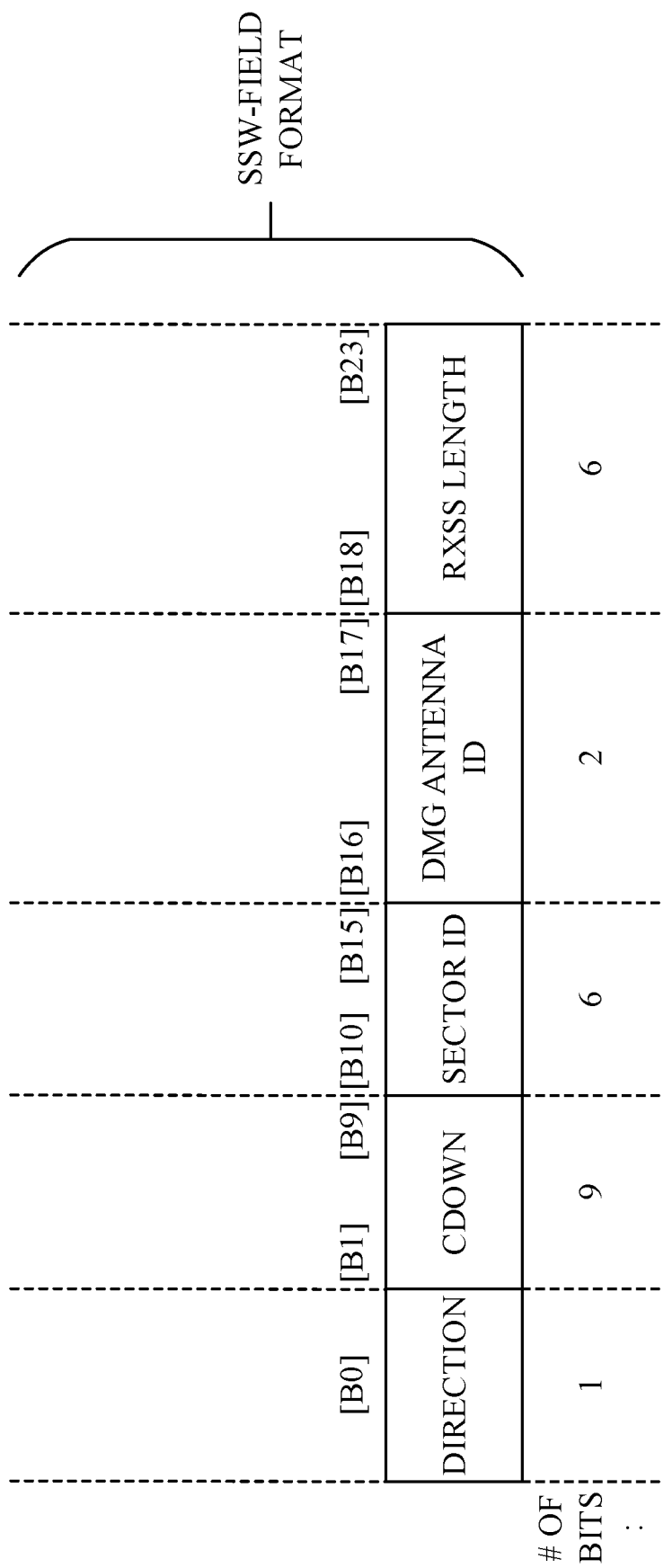
FIG. 3 depicts an example SSW-field format, in accordance with at least one embodiment.

An example SSW-field structure is shown in FIG. 3.

A first example SSW-feedback field is shown in FIG. 4A. This corresponds to when this is transmitted as part of an ISS.

A second example SSW-feedback field is shown in FIG. 4B. This corresponds to when this is not transmitted as part of an ISS.

Beamforming Refinement Protocol (BRP). Beam refinement is a process where a STA can improve its antenna configuration (or antenna weight vectors) both for transmission and reception. In the beam refinement procedure, BRP packets are used to train the receiver and transmitter antenna. There are two types of BRP packets: BRP-RX packets and BRP-TX packets. BRP packet may be carried by a DMG PPDU followed by a training (TRN) field containing an AGC field and a transmitter or receiver training field as shown in FIG. 5.

Figure 5:
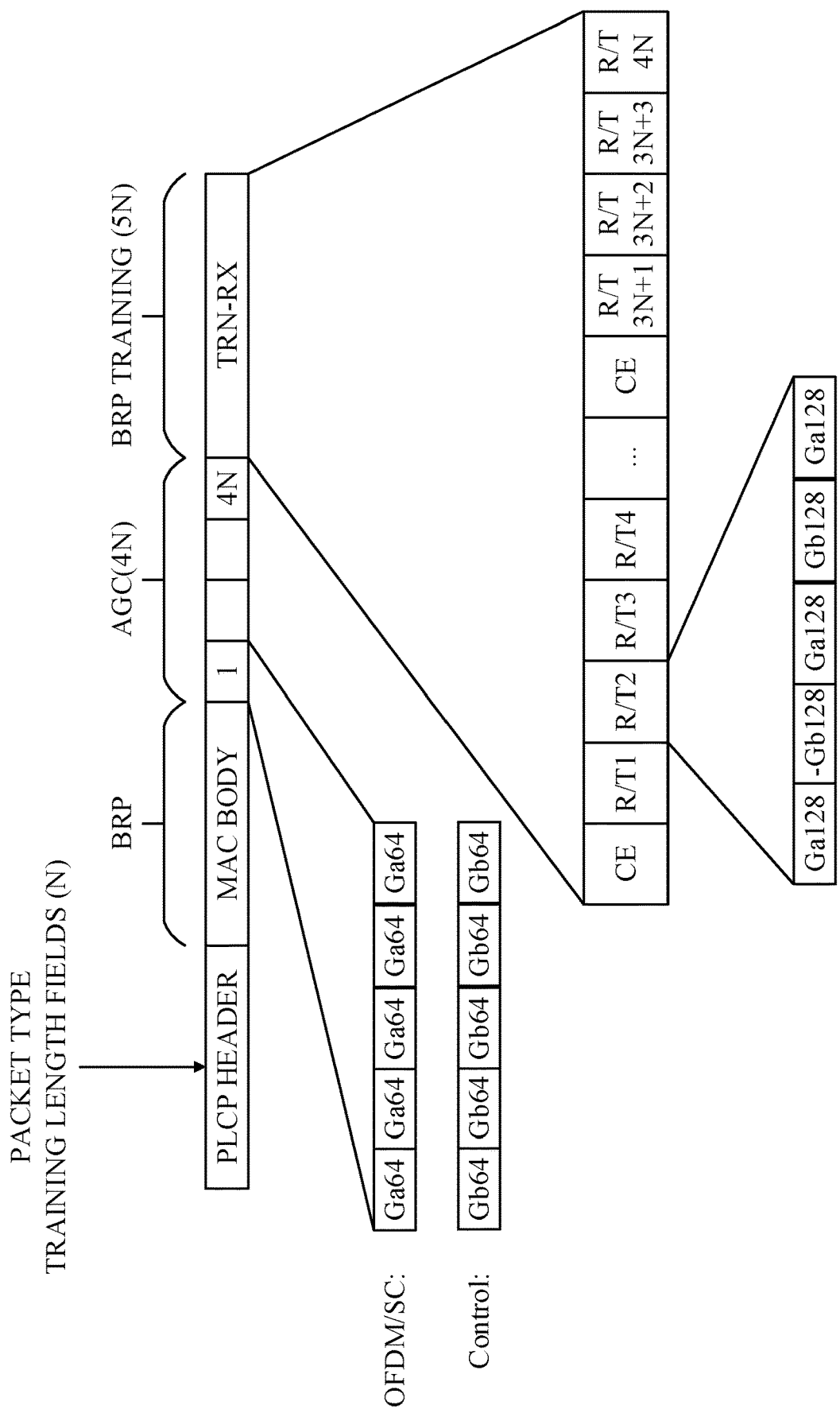
FIG. 5 depicts a first example packet structure, in accordance with at least one embodiment.

A value of N in FIG. 5 is the Training Length given in the header filed, which indicates that the AGC has 4N subfields and that the TRN-R/T field has 5N subfields. The CE subfield is the same as the one in the preamble described in the previous section. All subfields in the beam training field are transmitted using rotated $\pi/2$-BPSK modulation.

BRP MAC frame is an Action No ACK frame, which has the following fields:
Category
Unprotected DMG Action
Dialog Token
BRP Request field
DMG Beam Refinement element
Channel Measurement Feedback element 1
. . . .
Channel Measurement Feedback element k 802.11ay (TGay). Requirements of 802.11ay. Task Group ay (TGay), approved by IEEE in March 2015, is expected to develop an amendment that defines standardized modifications to both the IEEE 802.11 physical layers (PHY) and the IEEE 802.11 medium access control layer (MAC) that enables at least one mode of operation capable of supporting a maximum throughput of at least 20 gigabits per second (measured at the MAC data service access point), while maintaining or improving the power efficiency per station. This amendment also defines operations for license-exempt bands above 45 GHz while ensuring backward compatibility and coexistence with legacy directional multi-gigabit stations (defined by IEEE 802.11ad-2012 amendment) operating in the same band.

Although much higher maximum throughput than that of 802.11ad is the primary goal of TGay, some members of the group also discussed including mobility and outdoor support. More than ten different use cases are considered and analyzed in terms of throughput, latency, operation environment and applications (as discussed in IEEE 802.11-2015/0625r2, "IEEE 802.11 TGay Use Cases", Huawei, et. al.).

Since 802.11 ay will operate in the same band as legacy standards, it is required that the new technology will ensure backward compatibility and coexistence with legacies in the same band.

Beamforming in 802.11. BF Training Efficiency. BF training procedures specified in 802.11ad may achieve good performance if both initiator and responder train their transmitter/receiver beams respectively, which requires four training periods, and each training period may involve training and measurement on multiple beams. With channel/antenna reciprocity assumption, beams/sectors trained from downlink may be used for uplink too. Existing BF training procedures need to train initiator TX/RX and responder TX/RX to achieve good BF gain, which is not efficient.

Existing BF training procedures utilizing Beacon frames allow multiple STAs to perform measurements and select their best transmit beam from the AP/PCP. However, it may take several BIs until the STAs may complete the training. Latency is also an issue. Beyond this, there is no BF training procedure which may allow multiple STAs to train simultaneously.

Efficient BF training procedures are needed to support: ISS TXSS and ISS RXSS training using a unified training frame; and a low latency mechanism to train multiple users simultaneously. Disclosed herein are methods, procedures, and systems for providing and/or supporting such efficient MIMO BF training. In some embodiments, there are disclosed unified multicast training procedures.

Embodiment 1

In at least one embodiment, a unified multicast training procedure is used by an AP/PCP to train:
  All the STAs which intend to perform initial and/or updated MIMO BF training/tracking. Note, the STAs may or may not be associated with the AP/PCP. In other words, unassociated STAs may perform MIMO BF training with the AP/PCP.
  All the associated STAs which intend to perform initial and/or updated MIMO BF training/tracking.
  A group of STAs identified by the AP/PCP. The AP/PCP may group STAs for MIMO BF training/tracking using different criteria.

In an embodiment, a unified multicast training procedure may be performed using: BTI, A-BFT frame exchanges; In schedule based Service Period (SP); In Contention Based Access Period (CBAP).

Various disclosed embodiments can be used in channel-bonding scenarios.

Note, herein xIFS is used to indicate the inter-frame spacing in the Training/FB TXOP. Alternatively, more than one inter-frame spacing may be utilized in this procedure. For example, xIFS1 may be used between two Training Frames. xIFS2 may be used between the Training period and FB period. xIFS3 may be used between frames transmitted in the FB period. xIFS4 may be used between the FB period and MU ACK/M-STA ACK.

Note a sector/beam/AVW mentioned in this embodiment may be formed using single Phased Antenna Array (PAA) or multiple PAAs, or other type of antennas. When the transmitter/receiver sweep sectors/beams/AVWs, it may switch within one PAA or go through all the sectors/beams/AVWs using multiple/all PAAs.

In an embodiment, a unified multicast/broadcast MIMO BF training procedure includes: a training period, a training feedback period, and an acknowledgment period. In the training period, an initiator may transmit multiple unified training frames which may be used to perform transmit BF training of the initiator and the receive BF training of the responder(s). in the training feedback period, one or more responders may reply the training feedback frames. The training feedback frames may be transmitted using a random access, scheduled access or poll based access. In the acknowledgement period, the initiator may transmit acknowledgement frame to the responder(s).

Figure 6:
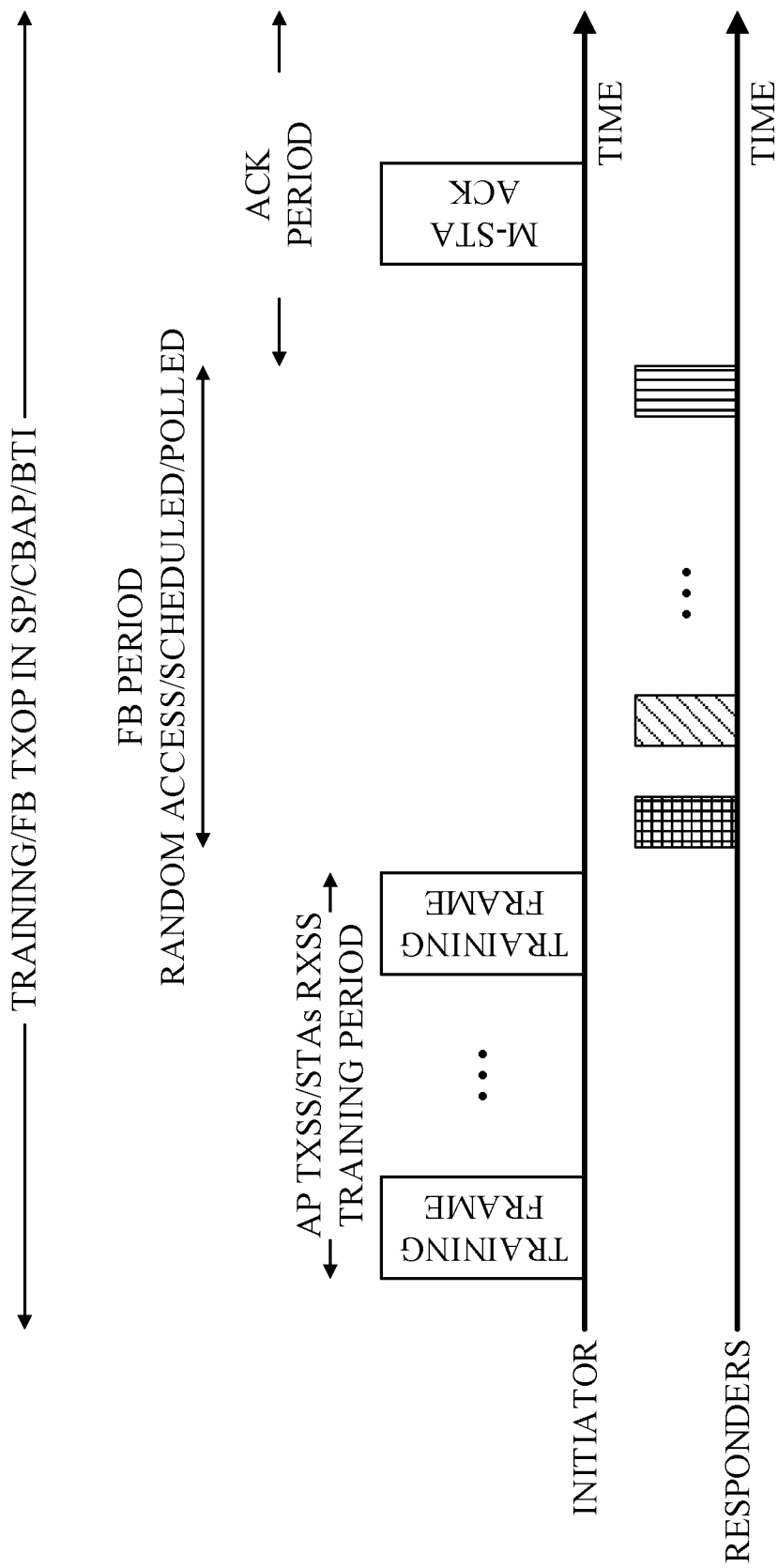
FIG. 6 depicts a first example timing diagram, in accordance with at least one embodiment.

An exemplary procedure is given in FIG. 6, which depicts a first example timing diagram, in accordance with at least one embodiment. The timing diagram of FIG. 6 comprises an example unified multicast/broadcast training procedure as generally set forth below.

Detailed procedures for AP/PCP and non-AP/non-PCP STAs are given below.

Note, TXOP periods allocated using this mechanism do not persist beyond a beacon interval.

Initiator (e.g., AP/PCP) procedure. In one embodiment, an initiator may include scheduling information in a Beacon frame, which may announce a Service Period for MIMO BF training/feedback. The initiator may define the starting time (which may be a time offset relative to the Beacon frame) and duration for the MIMO BF training/feedback period. Alternatively, the initiator may acquire media through contention. In a third option, the initiator may utilize a modified Beacon frame as the training frame.

The initiator may transmit N Training Frames in the training period. The value of N may be indicated in each Training Frame. Alternatively, the remaining number of Training Frames may be signaled in each Training Frame. Each time, a Training Frame may be transmitted using a sector/beam/antenna vector weight (AVW). Different Training Frames may be transmitted using different sectors/beams/AVWs. The Training Frames may be separated by an xIFS period. Alternatively, each time, one or more Training Frames may be transmitted using one or more sectors/beams/AVWs.

The PLCP header of the Training Frame may indicate: BSSID/Color which may be used to identify the initiator and/or the corresponding BSS; and/or K extra AGC/training sequences (i.e., TRN field) may be appended at the end of the Training Frame. K may depend on the maximum number of receive sectors/beams/AVWs to be trained.

The MAC body of the Training Frames may carry duration, sector/beam/AVW ID, the feedback request/preference information, the ACK info, etc.

Transmission of the Training Frame: Each time, the initiator may transmit one Training Frame using a sector/beam/AVW. Alternatively, the initiator may transmit Training Frame(s) using multiple sectors/beams/AVWs concurrently. The initiator may transmit the extra K training sequences using the same sector/beam/AVW as used by the other section of the Training Frame. Depending on the purpose of the MIMO BF training, the Training Frame may be coded and modulated using the lowest MCS level. Alternatively, if the purpose of the Training/FB TXOP is for BF tracking/refinement/updates, other MCS levels may be utilized.

In an xIFS period after the end of the Training period, the initiator may prepare to receive feedbacks from responders, which may be referred as the Feedback period. The FB period may be used to carry multiple feedback frames using multiple time slots. The length of each feedback time slot, which may be signaled in the Beacon Frame and/or previously transmitted Training Frame, may or may not be the same. In the case that the FB time slot has a fixed length/duration, the initiator may expect the responder to truncate the FB transmission at the boundary if needed. The FB period may be a multiple access period, and the possible FB type may be: FB period without polling; or FB period with polling.

For the type FB period without polling, the type may be random access or scheduled based access. In random access, multiple responders contend for multiple time slots to transmit. The initiator may announce restricted random access on some time slots in the Beacon frame or the Training frame before the FB period. In that case, only the responders which may satisfy the restriction may respond in that time slot. In scheduled based access, the initiator may schedule the transmissions in Training Frame(s) or Beacon Frame(s) or other types of control/management frames transmitted before the Training/FB TXOP.

For the type FB period with polling, each FB time slot may start with a polling frame transmitted from the initiator. In the xIFS period after the polling frame, the responders may transmit FB frame(s). The polling frame may carry indication of a responder or a group or a sub-group of responders who may transmit using this FB time slot. FB periods with polling may be random access or scheduled based access. In random access, multiple responders which may qualify for the transmission may contend for the FB time slot using a given random access protocol. In scheduled based access, the initiator may poll one responder for the FB. The polled responder may transmit FB frame xIFS period after the polling frame. In one embodiment, the polling frame may be omitted for the first FB frame if the last Training Frame may be interpreted as a first polling frame. In some embodiments, the polling frame may be transmitted using the quasi-Omni weight or other weight. The polling frame may be transmitted using a low data rate coding and modulation scheme, e.g., the lowest MCS.

In one embodiment, the FB period may be used to carry acknowledgement from the initiator. xIFS time after the reception of a FB frame, the initiator may transmit an acknowledgement frame to the responder if the previously transmitted FB frame may be successfully decoded.

xIFS period after the end of the FB period, the initiator may prepare to transmit one or more acknowledgement frames. In one embodiment, the initiator may transmit a multi-STA acknowledgement (M-STA ACK) frame to multiple responders. The M-STA ACK may be transmitted using quasi-Omni weight and modulated and coded using the lowest MCS level. The M-STA ACK frame may be repeated in the time and/or frequency domain to improve the reliability. In another embodiment, the initiator may transmit multiple ACK/BA frames to multiple responders. The transmission may be separated by time period xIFS. Each ACK/BA frame may be transmitted using the best sector/beam/AVW selected based on the feedbacks transmitted in FB period. Alternatively, the initiator may transmit an ACK announcement frame xIFS time after the end of FB frame. The announcement frame may be used to broadcast ACK/BA scheduling information using the lowest MCS and quasi-Omni antenna patterns. xIFS time after the announcement frame, the initiator may start transmitting the first ACK/BA frame. More ACK/BA frame may follow.

Responder (e.g., non-AP/non-PCP STAs) procedure. In some embodiments, a responder may participate in the Training/FB period if one or more conditions met:
  The responder may not have NAV set during the TXOP.
  The responder may intend to perform MIMO/BF training with the initiator.
  The responder may be polled by the initiator.
  The responder may qualify the certain condition(s) carried in Beacon and/or Training Frame to perform MIMO/BF training using the scheduled Training/FB period.
  The responder may monitor the Beacon frame which may announce the schedule of the Training/FB TXOP.
  The responder may successfully detect one of the Training Frames, and notice the Training/FB TXOP.

The responder may successfully detect one of the Training Frames using a quasi-Omni beam or other sector/beam/AVW selected. Based on the information carried in the MAC frame of the Training Frame, the responder may know the total number of Training Frames transmitted in the training period and/or the remaining number of Training Frames to be transmitted. Alternatively, the total number of Training Frames transmitted in the training period may be carried in a Beacon frame. Based on the information carried in the Training Frame PLCP header, the responder may be notified that K extra AGC/Training sequences may be appended to the end of the current Training Frame to allow responder receive beam training. If K is greater than or equal to the number of receiving sectors/beams/AVWs to be trained, the responder may switch its receiving sectors/beams/AVWs over all the possible combinations. In the case K is greater than the number of receiving sectors/beams/AVWs to be trained, the responder may use the extra AGC/Training sequence(s) on selected receiving sectors/beams/AVWs to get more accurate measurements. If K is less than the number of receiving sectors/beams/AVWs to be trained, the responder may check its training history, if any, and select K receiving sectors/beams/AVWs. Alternatively, the responder may keep a record of trained beams and complete the receiving MIMO BF training using multiple Training/FB TXOPs.

The responder may begin feedback period xIFS time after the end of the training period. The responder may estimate the length of the training period and prepare FB if needed in the following FB period based on the type of FB period. Alternatively, the responder may know the duration of the Training Period through the Beacon Frame which schedule the Training TXOP and thus know the boundary of the training period and FB period. For FB periods without polling:
  With random access FB, the responder may determine a time slot to transmit the FB using certain random access protocol. The responder may start the FB transmission at the beginning of the time slot.
  With schedule based FB, the responder may transmit at the beginning of the scheduled time slot.
  For FB periods with polling:
  With random access FB, the responder may determine a time slot to transmit the FB using certain random access protocol. xIFS time after the polling frame, the responder may transmit the FB frame. Alternatively, the responder may be triggered by the polling frame to start the random access protocol for the FB transmission.

With schedule based FB, the initiator may poll one responder for the FB. The polled responder may transmit FB frame xIFS period after the polling frame.

BF transmission of the FB frame. If antenna/channel reciprocity is assumed, the FB frame may be transmitted using the best sector/beam/AVW trained as in the Training period at the responder side. In this case, the best transmit sector/beam/AVW may be the same as the best receive sector/beam/AVW trained at the responder side. Otherwise the responder may utilize a selected sector/beam/AVW or Quasi-Omni weight.

Coding and modulation of the FB frame. The FB frame may be coded and modulated using the lowest MCS level. Alternatively, the initiator may assign MCS level for FB in Training frame or Beacon frame. In a third method, depending on the beamforming scheme used for FB frame, the responder may determine the MCS used. For example, if the FB frame is transmitted using a trained narrow beam, the responder may utilize higher MCS level (MCS with higher data rate). If the FB frame is transmitted using a wide beam or Quasi-Omni beam, the responder may utilize a lower MCS level.

In one embodiment, the FB period may be used to carry acknowledgement from the initiator. xIFS time after the end of a FB frame, the responder may expect to receive an acknowledgement frame from the initiator. The responder may use the trained best receive sector/beam/AVW for the reception. If the responder may not receive anything after yIFS time period, the responder may consider the failure of FB transmission. yIFS may be longer than xIFS. In the case that each FB time slot may be with a fixed duration, the responder may truncate the transmission at the boundary. The extra FB frame may be needed to complete the feedback procedure.

The responder(s) may expect to receive an acknowledgement frame from the initiator xIFS period after the end of FB period. In one embodiment, the responder may receive an M-STA ACK frame which may be a broadcast/multicast frame transmitted from the initiator. Each responder may check the per user field in the frame, which may contain a STA ID. If one STA ID may match the responder's ID, the responder may check the ACK/BA field corresponding to the STA ID. In another embodiment, the responder may receive one or multiple ACK/BA frames from the initiator. One of the ACK/BA frame may be addressed to the responder. The responder may check the ACK/BA information contained in that frame. Alternatively, the responder may receive an announcement frame xIFS time after the end of FB frame. The announcement frame may contain ACK/BA scheduling information to multiple responders. The responder may determine the time/frequency offset of the expected ACK/BA frame corresponding to the announcement frame. The responder to check its ACK/BA frame based on the time/frequency offset. In the case that the responder may not receive any ACK or receive a negative ACK in the acknowledgement period, the responder may determine failure of the FB transmission. The responder may wait for another opportunity to perform training and/or feedback in the future.

Embodiment 2

Figure 7:
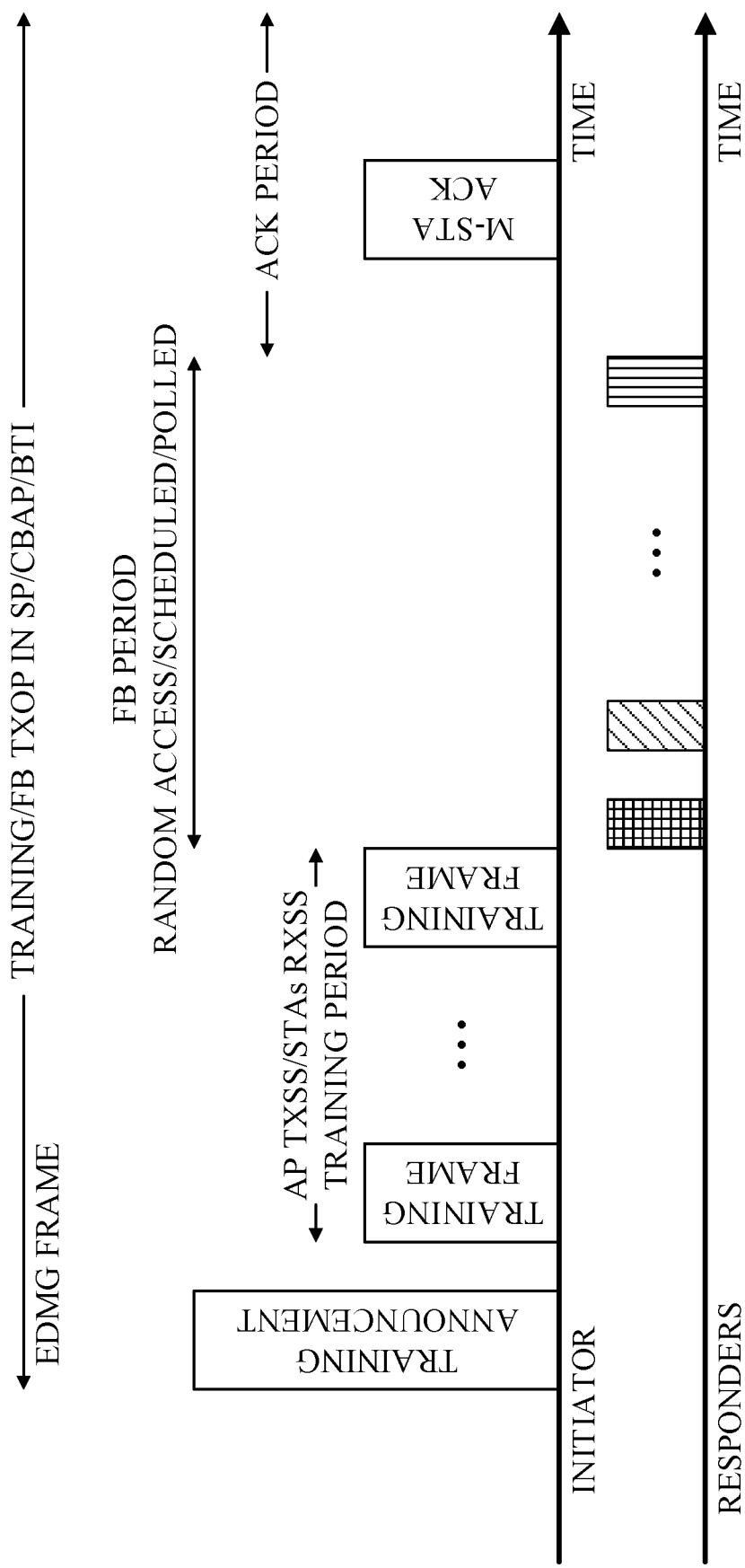
FIG. 7 depicts a second example timing diagram, in accordance with at least one embodiment.

With reference to a second embodiment, another unified multicast/broadcast MIMO BF training procedure is disclosed. With this procedure, the training/FB TXOP may be composed of three main components—a Training period, a FB period, and an ACK period—which are scheduled and announced by a Training Announcement frame transmitted at the beginning of the TXOP (as shown in FIG. 7). In one embodiment, the three components may be transmitted within one TXOP (as shown in FIG. 7). In another embodiment, the three components may be transmitted through different TXOPs, which may be schedule based and/or contention based. The Training announcement frame may or may not present at the beginning of each TXOP.

Note, TXOP periods allocated using this mechanism do not persist beyond a beacon interval.

FIG. 7 depicts a second example timing diagram, which illustrates a second example unified multicast/broadcast training procedure with a Training Announcement frame.

Initiator (e.g., AP/PCP) procedure. An initiator may acquire the media through contention and/or scheduling. In the case of scheduling, a Beacon frame or a frame transmitted in announcement transmission interval (ATI) may be used to include the starting time and duration of the training/FB TXOP. Alternatively, the initiator may utilize a modified Beacon frame as training frame.

The initiator may transmit a Training Announcement frame to indicate:
  The length of the entire TXOP.
  Time/Frequency Allocation for training period. For example, the allocation start time, allocation duration, and allocated channel index may be defined for the training period. Here the allocated channel index may be replaced with other type of signaling, which may be used to uniquely indicate the starting frequency (or center frequency) and allocated bandwidth.
  Time/Frequency Allocation for FB period. For example, the allocation start time, allocation duration, and allocated channel index may be defined for the FB.
  Time/Frequency Allocation for acknowledgement period. For example, the allocation start time, allocation duration, and allocated channel index may be defined for the acknowledgement period.

The initiator may transmit N Training Frames in the training period. N may be indicated in the Training Announcement frame and/or each Training Frame. Alternatively, the remaining number of Training frame may be signaled in each Training Frame. Each time, a Training Frame may be transmitted using a sector/beam/antenna vector weight (AVW). Different Training Frames may be transmitted using different sectors/beams/AVWs. The Training Frames may be separated by an xIFS period. Alternatively, each time, one or more Training Frames may be transmitted using one or more sectors/beams/AVWs.

The PLCP header of the Training Frame and/or the Training Announcement frame may indicate:
  BSSID/Color which may be used to identify the initiator and/or the corresponding BSS.
  K extra AGC/training sequences may be appended at the end of the Training Frame. K may depend on the maximum number of receive sectors/beams/AVWs to be trained.

The MAC body of the Training Frames may carry duration, sector/beam/AVW ID, the feedback request/preference information, the ACK info etc. Alternatively, the MAC body may not present. Instead, the Training Announcement frame may carry information about FB request/preference information, and ACK information etc. One field in PLCP header may be used to indicate the Training Frame may not contain any MAC body. With that indication, the SIG field may be overwritten to carry information such as sector/beam/AVW ID. This kind of Training Frame may be referred as a NDP Training Frame. Transmission of the Training Frame may be the same as discussed previously.

xIFS period after the end of the Training period, the initiator may prepare to receive feedbacks from responders, which may be referred as Feedback period.

The FB period may be used to carry multiple feedback frames using multiple time slots. The length of each feedback time slot, which may be signaled in the Announcement Frame, may or may not be the same. In the case that the FB time slot is with the fixed length/duration, the initiator may expect the responder to truncate the FB transmission at the boundary if needed. The FB period may be a multiple access period, and the possible FB type, which may be signaled in the Training Announcement Frame, may be FB period without polling or FB period with polling.

An FB period without polling may be random access or schedule based access. In random access, multiple responders contend multiple time slots to transmit. The initiator may announce restricted random access on some time slots in the Training Announcement Frame. In that case, only the responders which may satisfy the restriction may respond in that time slot. In schedule based access, the initiator may schedule the FB transmissions in Training Announcement Frame or Beacon Frame or Training Frame or other type of control/management frames transmitted before the Training/FB TXOP.

For FB periods with polling, each FB time slot may start with a polling frame transmitted from the initiator. xIFS period after the polling frame, the responders may transmit FB frame(s). The polling frame may carry indication of a responder or a group or a sub-group of responders who may transmit using this FB time slot. FB periods with polling may be random access or schedule based. In random access, multiple responders which may qualify the transmission may contend for the FB time slot using certain random access protocol. In schedule based access, the initiator may poll one responder for the FB. The polled responder may transmit FB frame xIFS period after the polling frame. In another embodiment, the polling frame may be omitted for the first FB frame if the last Training Frame may be interpreted as a first polling frame. In some embodiments, the polling frame may be transmitted using the quasi-Omni weight or other weight. The polling frame may be transmitted using a low data rate coding and modulation scheme, e.g., the lowest MCS.

In another embodiment, the FB period may be used to carry acknowledgement from the initiator. xIFS time after the reception of a FB frame, the initiator may transmit an acknowledgement frame to the responder if the previously transmitted FB frame may be successfully decoded. This kind of transmission may be signaled in the Training Announcement Frame.

xIFS period after the end of the FB period, the initiator may prepare to transmit one or more acknowledgement frames. In one embodiment, the initiator may transmit a multi-STA acknowledgement (M-STA ACK) frame to multiple responders. The M-STA ACK may be transmitted using quasi-Omni weight and modulated and coded using the lowest MCS level. The M-STA ACK frame may be repeated in time and/or frequency domain to improve the reliability. In another embodiment, the initiator may transmit multiple ACK/BA frames to multiple responders. The transmission may be separated by xIFS time period. Each ACK/BA frame may be transmitted using the best sector/beam/AVW selected based on the feedbacks transmitted in FB period. Alternatively, the initiator may transmit an ACK announcement frame xIFS time after the end of FB frame. The announcement frame may be used to broadcast ACK/BA scheduling information using the lowest MCS and quasi-Omni antenna patterns. xIFS time after the announcement frame, the initiator may start transmitting the first ACK/BA frame. More ACK/BA frame may follow.

Responder (e.g., non-AP/non-PCP STAs) procedure. A responder may participate the Training/FB period if one or more conditions met:

The responder may not have NAV set during the TXOP.
The responder may intend to perform MIMO/BF training with the initiator.
The responder may be polled by the initiator.
The responder may qualify the certain condition(s) carried in Training Announcement Frame, Beacon and/or Training Frame to perform MIMO/BF training using the scheduled Training/FB period.
The responder may monitor the Beacon frame which may announce the schedule of the Training/FB TXOP.
The responder may successfully detect one of the Training Frames, and notice the Training/FB TXOP.

The responder may detect the Training Announcement Frame, and notices the allocation of Training period, FB period, and Acknowledgement period. The responder may know the total number of Training Frames transmitted in the training period.

The responder may successfully detect one of the Training Frames using a quasi-Omni beam or other sector/beam/AVW selected. Based on the information carried in the MAC frame of the Training Frame, the responder may know the remaining number of Training Frames to be transmitted. Alternatively, if NDP Training frame is utilized, the responder may notice that by checking the NDP indication bit in PLCP header and re-interpret the PLCP header of the Training frame to obtain the information. Based on the information carried in Training Frame PLCP header and/or the Training Announcement frame, the responder may notice K extra AGC/Training sequences may be appended to the end of the current Training Frame which may allow the responders to train receive beams. If K is greater than or equal to the number of receiving sectors/beams/AVWs to be trained, the responder may switch its receiving sectors/beams/AVWs over all the possible combinations. In the case where K is greater than the number of receiving sectors/beams/AVWs to be trained the responder may use the extra AGC/Training sequence on selected receiving sectors/beams/AVWs to get more accurate measurements. If K is less than the number of receiving sectors/beams/AVWs to be trained, the responder may check its training history if any, and select K receiving sectors/beams/AVWs. Alternatively, the responder may keep a record of trained beams and complete the receiving MIMO BF training using multiple Training/FB TXOPs.

The responder may begin feedback period xIFS time after the end of the training period. The responder may estimate the length of the training period and prepare FB if needed in the following FB period based on the type of FB period. Alternatively, the responder may know the duration of the Training Period through the Training Announcement Frame and thus know the boundary of the training period and FB period. FB periods may be with or without polling.

For FB periods without polling, there may be random access or schedule based FB. In random access FB, the responder may determine a time slot to transmit the FB using certain random access protocol. The responder may start the FB transmission at the beginning of the time slot. In schedule based FB, the responder may transmit at the beginning of the scheduled time slot. The FB scheduling information may be carried in the Training Announcement Frame.

For FB periods with polling, there may be random access or schedule based FB. In random access FB, the responder may determine a time slot to transmit the FB using certain random access protocol. xIFS time after the polling frame, the responder may transmit the FB frame. Alternatively, the responder may be triggered by the polling frame to start the random access protocol for the FB transmission. In schedule based FB, the initiator may poll one responder for the FB. The polled responder may transmit the FB frame xIFS period after the polling frame.

BF transmission of the FB frame. If antenna/channel reciprocity is assumed, the FB frame may be transmitted using the best sector/beam/AVW trained in the Training period at the responder side. In this case, the best transmit sector/beam/AVW may be the same as the best receive sector/beam/AVW trained at the responder side. Otherwise the responder may utilize a selected sector/beam/AVW or Quasi-Omni weight.

Coding and modulation of the FB frame. The FB frame may be coded and modulated using the lowest MCS level. Alternatively, the initiator may assign MCS level for FB in Training frame or Beacon frame. In a third method, depending on the beamforming scheme used for FB frame, the responder may determine the MCS used. For example, if the FB frame is transmitted using a trained narrow beam, the responder may utilize higher MCS level (MCS with higher data rate). if the FB frame is transmitted using a wide beam or Quasi-Omni beam, the responder may utilize lower MCS level. In one embodiment, the FB period may be used to carry acknowledgement from the initiator. xIFS time after the end of a FB frame, the responder may expect to receive an acknowledgement frame from the initiator. The responder may use the trained best receive sector/beam/AVW for the reception. If the responder may not receive anything after yIFS time period, the responder may consider the failure of FB transmission. yIFS may be longer than xIFS. In cases where each FB time slot may have a fixed duration, the responder may truncate the transmission at the boundary. The extra FB frame may be needed to complete the feedback procedure.

The responder(s) may expect to receive an acknowledgement frame from the initiator xIFS period after the end of FB period. Alternatively, the allocation of the acknowledgement period may be signaled in the Training Announcement Frame. In one embodiment, the responder may receive an M-STA ACK frame which may be a broadcast/multicast frame transmitted from the initiator. Each responder may check the per user field in the frame, which may contain a STA ID. If one STA ID may match the responder's ID, the responder may check the ACK/BA field corresponding to the STA ID. In another embodiment, the responder may receive one or multiple ACK/BA frames from the initiator. One of the ACK/BA frame may be addressed to the responder. The responder may check the ACK/BA information contained in that frame. Alternatively, the responder may receive an ACK announcement frame xIFS time after the end of FB frame. The ACK announcement frame may contain ACK/BA scheduling information to multiple responders. The responder may determine the time/frequency offset of the expected ACK/BA frame corresponding to the announcement frame. The responder to check its ACK/BA frame based on the time/frequency offset. In the case that the responder does not receive any ACK or receives a negative ACK in the acknowledgement period, the responder may determine the failure of the FB transmission. The responder may wait for another opportunity to again perform training and/or feedback.

Frame Designs

Herein, frames utilized for unified multicast training procedures in exemplary embodiments are described.

Training Frame. A Training Frame may carry training sequences to train both initiator transmit beams and/or responder receive beams. The training sequences for initiator transmit beams and responder receive beams may be designed separately. A Training Frame may or may not carry MAC body. A Training Frames may be broadcast/multicast frames to multiple users.

Figure 8:
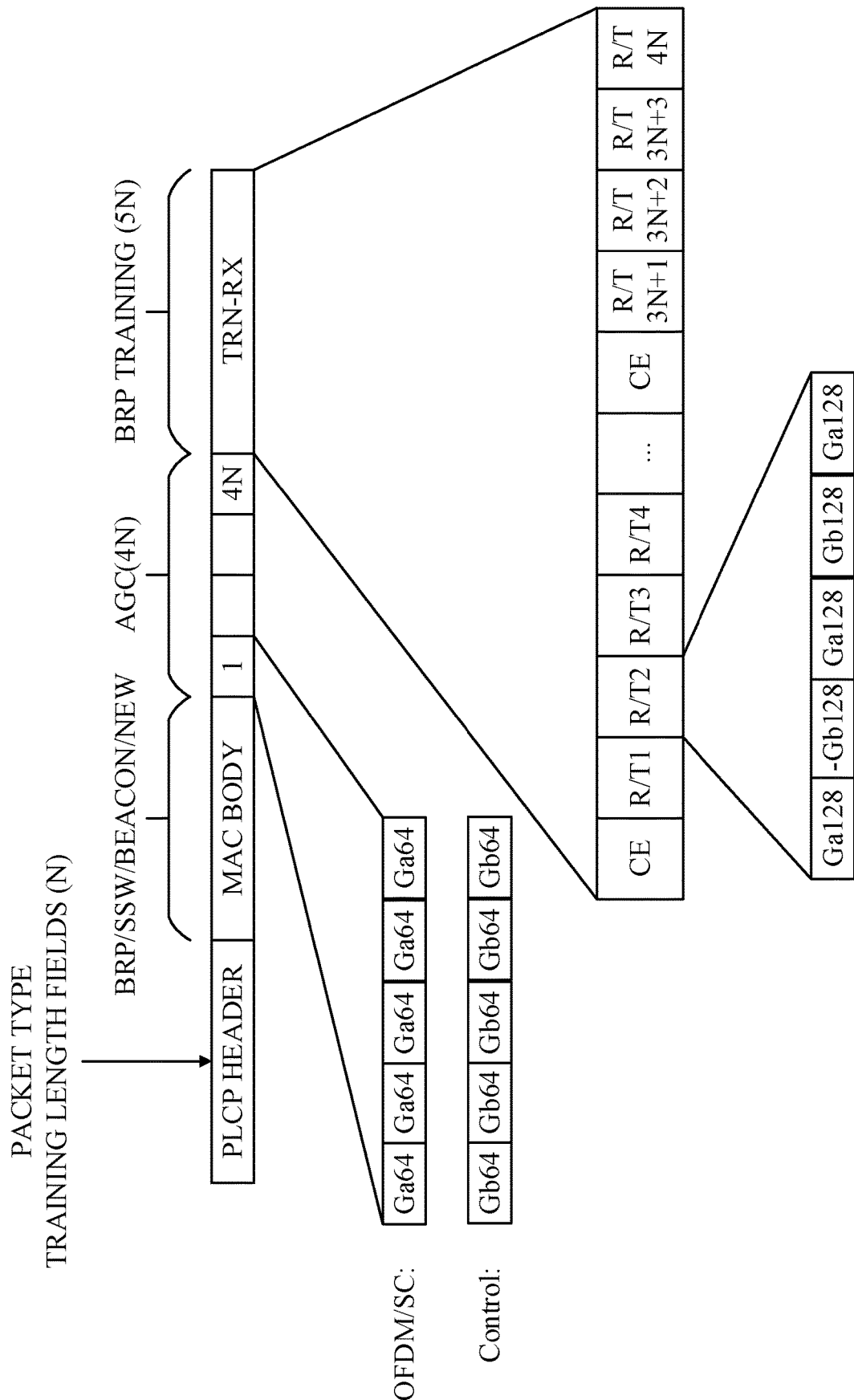
FIG. 8 depicts a second example packet structure, in accordance with at least one embodiment.

A Training Frame PPDU may be designed as shown in FIG. 8, depicting an exemplary frame PPDU design. Depending on the requirement of backward compatibility, the Training Frame PPDU may be a DMG PPDU (which is defined in 802.11ad), a EDMG PPDU (which is defined for 802.11ay), or other type of PPDU. The PLCP header may follow the specified header format. The MAC body may be a SSW frame, a BRP frame, a Beacon frame or a newly designed frame. AGC field and TRN-RN field (which is used for responder receive beam training) may be followed. The sizes of AGC and TRN-RN field may be determined by the number N, which may be signaled in the PLCP header. 4N is the maximum number of receive beams to be trained at the responder side.

Figure 9:
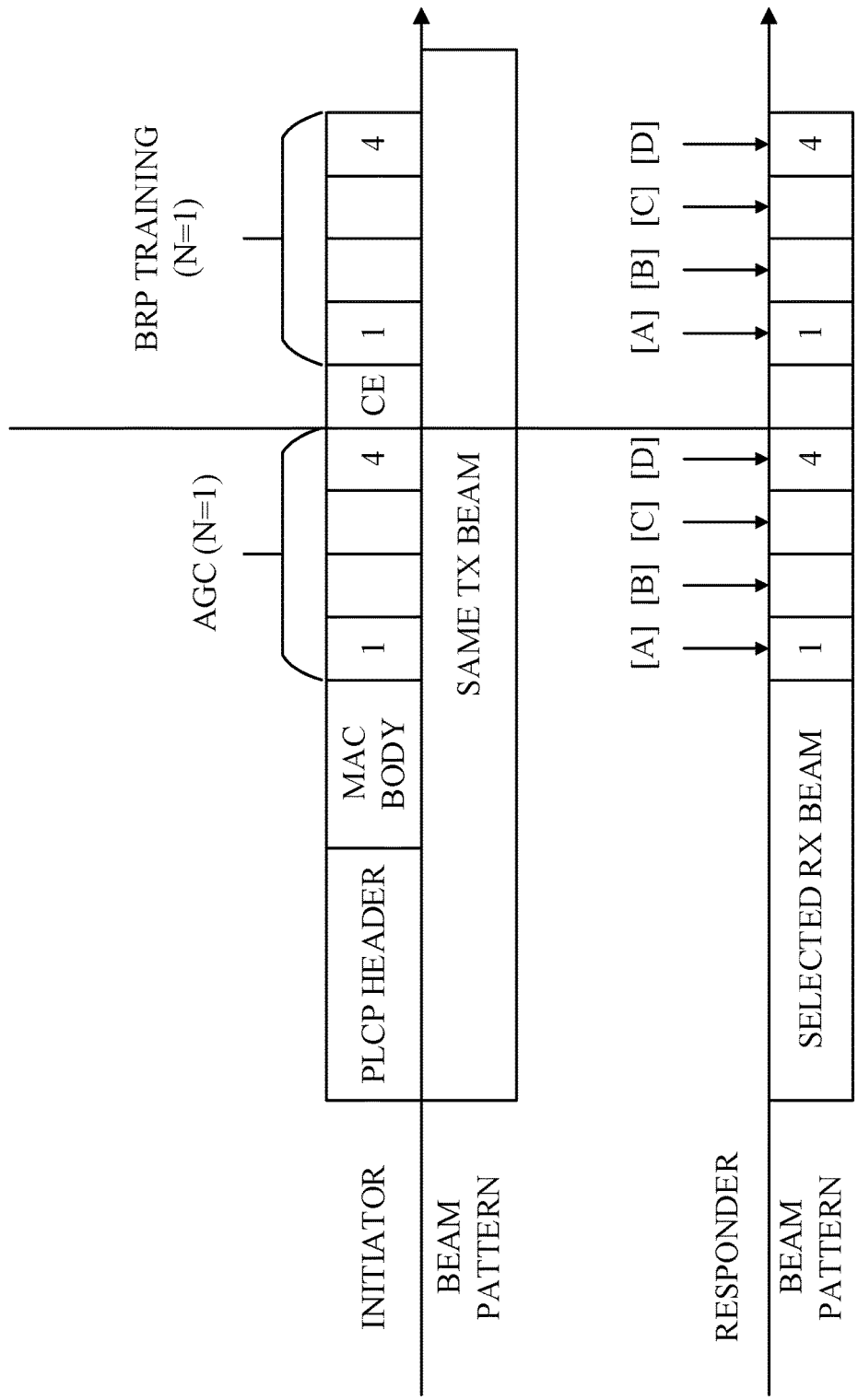
FIG. 9 depicts a third example timing diagram, in accordance with at least one embodiment.

An exemplary usage of initiator beam pattern and responder beam pattern is shown in FIG. 9 for an example beam-training scheme. In this example, it is assumed that N=1, however, it would be easy to extend to any N>1 case (and clear to any person of ordinary skill in the relevant art). The initiator may transmit the entire Training PPDU using the same transmit beam. The responder, however, may use its selected beam for reception of the PLCP header and MAC body. The selected beam may be implementation dependent. For example, it may be the best known receive beam corresponding to the initiator, or it may be a Quasi-Omni beam. Starting from the AGC field, the responder may sweep its receive beams or change its antenna vector weights for receive beam training. In the example of FIG. 9, there are four AGC subfields, thus, the responder may sweep four beams/weights (say beams 1-4). In the TRN-RX field, there is one channel estimation (CE) sub-field, and four training sub-fields. The responder may use the selected beam to receive the CE sub-field and use beams 1-4 to detect the four training sub-fields. In FIG. 9, the bracketed letters [A], [B], [C], and [D] may represent repeating colors or any other way to show a repeating pattern.

The MAC body, which may be referred as Training MAC frame may contain any or all of the following fields: Transmit address (TA); Receive address (RA); Duration; PAA/Antenna ID; Polarization ID; Beam/sector/codebook ID; CDOWN; and Feedback period requirement. The transmit address (TA) comprises transmit MAC address. The receive address (RA) comprises the receive MAC address. In cases where the Training MAC frame is a broadcast/multicast frame, the RA may be a broadcast/multicast address. Duration comprises the duration to the end of the Training TXOP. The PAA/Antenna ID field may be used to indicate the PAA/Antenna utilized for this transmission. If a dual polarization antenna is utilized, the polarization ID may be used to indicate a polarization direction for the transmission. Alternatively, in some embodiments, this field may be omitted and polarization direction may be indicated using PAA/Antenna ID. The beam/sector/codebook ID field may be used to indicate the beam or sector or precoding weight in a predefined codebook utilized for this transmission. CDOWN comprises the number of remaining Training Frames. The Feedback period requirement may carry any or all of the following subfields: starting time of the FB period; duration of the FB period; FB type; Fixed FB time slot; FB requirement; Acknowledgement included.

The FB type may indicate, for example, the following: polling based random access; polling based scheduled access; random access without polling; scheduled access without polling. Alternatively, this field may be replaced by two fields. One is poll required field and another is the random access required field.

Fixed FB time slot may indicate whether the FB time slot is fixed. In the case of fixed FB time slot, the time slot duration may be specified and/or signaled in the Training Frame.

FB requirement may indicate whether quantized BF is required and/or channel state information (CSI) is required. The quantized BF may refer to PAA ID, Polarization ID, and/or Beam ID feedback. With CSI information feedback, CSI of the M strongest taps may be requested for feedback. M may be signaled in the Training Frame.

Acknowledgement included may indicate whether acknowledgement is included in the FB period.

Training Announcement Frame. A Training Announcement Frame may carry information for the training period, feedback period, and acknowledgement period. The Training Announcement Frame may be broadcast/multicast frames to multiple users. The Training Announcement Frame may be transmitted using EDMG PPDU, or other types of PPDU. The Training Announcement Frame may carry the following fields: TA, RA, Duration, Training Type, training period frequency/time allocation, feedback period frequency/time allocation, acknowledgement period frequency/time allocation, number of Training Frames to be transmitted, and number of receive beams to be trained (N is further discussed above).

TA may be the transmit MAC address. RA may be the receive MAC address. In the case that the Training MAC frame is a broadcast/multicast frame, the RA may be a broadcast/multicast address. Duration may be the duration to the end of the Training TXOP.

Training type may comprise: initiator Tx training; combined initiator Tx training and responder Rx training; initiator multi-Tx training; or combined initiator multi-Tx training and responder Rx training. For combined initiator Tx training and responder Rx training, a Training Frame may contain the TRN-RX field for responder Rx training. For initiator multi-Tx training, the initiator may transmit multiple beams simultaneously for MIMO BF training.

Training period frequency/time allocation may include BW and channel allocation, as well as starting time and duration for the Training period.

Feedback period frequency/time allocation may indicate if a FB period is present. If this field is set, then indicated information may include: BW and channel allocation; starting time and duration for the Feedback period; and/or feedback period requirement. A feedback period requirement field may contain the same information disclosed above in relation to Training MAC frames. In other cases, such as where the field is not present, a FB period may be scheduled later.

Acknowledgement period frequency/time allocation may indicate if an acknowledgment period is present. If this field is set, then indicated information may include: BW and channel allocation; and/or starting time and duration for the Acknowledgement period. In other cases, acknowledgements transmitted from the initiator may be in the FB period.

Alternatively, the Training Announcement Frame may be modified based on Grant frame as defined in 802.11ad.

Opportunistic BF Training. In order to support simultaneous BF training for multiple STAs, an initiator, such as an AP or PCP, may transmit a sufficient number of BF training frames in order to provide sufficient information of the channel for all STAs with different number of antenna or PAAs and different number of sectors. A STA which is not the intended target of a BF training may be able to receive BF training frames intended for another STA. The STA may provide unsolicited feedback to the initiator, e.g., an AP or PCP, based on the received BF training frames intended for a different STAs, or intended for a group of STAs, which may or may not include the STA itself.

For example, the STA may provide an unsolicited SSW feedback or SSW ACK frame, or a newly designed Unsolicited Feedback frame, to report to the initiator the best one or more of sector, beam, antenna that it has received. The unsolicited feedback frame may also include information during which BF training session such feedback information was obtained; such information may include the IDs (such as MAC address, AIDs, or other types of IDs) of the initiator, responder (which may be a group of STAs, identified by a group ID or a broadcast or multicast ID), time of the received training sessions, etc. The STA may provide feedback either unsolicited or during OFMDA random access, or CBP, or scheduled SP or a pre-defined feedback TXOP, or in any other manner.

In another implementation, a STA may establish a long term training agreement, and/or unsolicited feedback, and/or a group training agreement. STAs and APs and PCPs may exchange the capability of long term training, and/or unsolicited feedback, and/or group training. Once such agreement is established, the AP or PCPs or any other STAs may initiate regular BF trainings according to a schedule or announcement that is included in beacons or other type of management or control frames. Once receiving one or more rounds of BF training frames, a STA with established long term training agreement, and/or unsolicited feedback and/or a group training agreement with the initiator may provide feedback either unsolicited or during OFMDA random access, or CBP, or scheduled SP or a pre-defined feedback TXOP, or in any other manner. If a STA has multiple antenna/beam/sectors, and if not all antenna/beam/sectors can be trained using the number of received BF frames, the STA may provide partial feedback. In the partial feedback, the STA may also indicate the number of additional BF frames, sectors, beams that need to be trained. In addition, the STA may also request additional training TXOP, e.g., for RSS or responder BF training. The STA may provide partial feedback either unsolicited or during OFMDA random access, or CBP, or scheduled SP or a pre-defined feedback TXOP, or in any other manner.

Random Multi Access of Feedback. The initiator may set up the multiple access rule for feedback. In one method, the FB period may be accessed randomly. In order to reduce the collision probability for random access, a restricted feedback scheme with random access is disclosed. The Feedback period may be partitioned into non-overlapping time slots, on which some access restrictions may be applied. Only the STAs which satisfy the restriction may use the time slot to transmit feedback frame. The restricted feedback period may be announced in a Beacon frame, a Training Announcement frame or specified in the standard. The restrictions may include one or more of the following:

The initiator may indicate a group of STAs, which may be within the coverage range of one or multiple TX sectors/beams of the initiator to transmit on one or few specified time slots. With antenna/channel reciprocity assumption, the initiator may assume the best Rx sector/beam associated with the qualified responders may be known, and thus the initiator may use the Rx sector/beam on the corresponding time slot(s) for FB reception.

The initiator may indicate a group of STAs, which may perform certain type of feedback to transmit on one or few specified time slots. For example, the initiator may indicate: the STAs which may feedback the best sector ID using time slot group 1; the STAs which may feedback the best two sectors using time slot group 2; the STAs which may feedback the CSI using one receive RX frontend using time slot group 3; the STAs which may feedback the CSI using two receive RX frontend using time slot group 4; etc. In this example the time slot may have the same size within each group, and may be varied from group to group.

Figure 10:
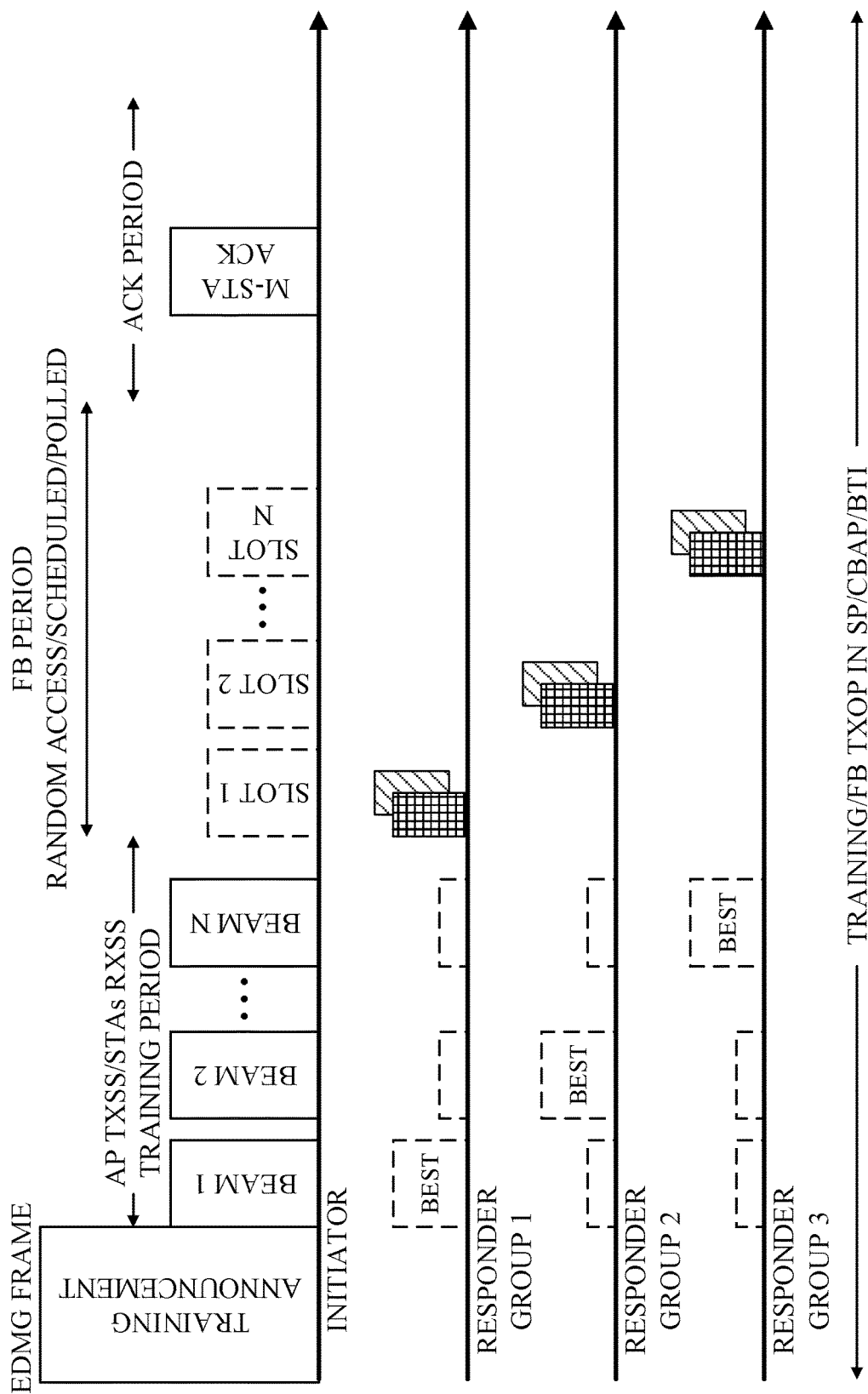
FIG. 10 depicts a fourth example timing diagram, in accordance with at least one embodiment.

FIG. 10 shows an exemplary procedure of sector/beam restricted FB scheme with random access. In this example, in a Training Announcement frame, the initiator may indicate the initiator Tx training using N Training Frames to train N beams/sector. The initiator may indicate the FB period may contain K time slots, and indicate the restricted random access rule on each time slot. Alternatively, the restricted random access rule may be announced by a Beacon frame, or other type of management frame. Or it may be specified in a standard. In other embodiments, the access may be scheduled or polled.

In the example of FIG. 10, K=N. As such, responders which choose the kth Tx beam/sector may reply in the kth random access time slot. In the case of K>N, more than one random access time slot may be assigned for responders which may associate with one Tx beam/sector. In the case of K<N, one random access time slot may be assigned for responders which may associate with more than one Tx beams/sectors.

The initiator may transmit the N Training Frames using N sectors/beams. The responders may determine the best Tx beam/sector of the initiator.

In the FB period, the initiator may sweep its receive beams/sectors on different time slots. For a kth time slot, the initiator may use the receive beam, which may correspond to the kth Tx beam/sector in the previous Training Period, for reception. As shown in FIG. 10, the initiator may sweep the receive beams which may have the same/similar antenna setting or beam weight as the Tx beams/antenna weights/sectors which were used to transmit the Training frames. The responders which satisfy the restriction may contend and transmit. In the example shown in FIG. 10, the responders may be implicitly grouped to N groups. The responder group k which considers the kth Tx beam/sector from the initiator as the best (or one of the best) among all of the Tx beams/sectors may contend for feedback transmission.

In some embodiments, two or more of the procedures described above may be combined.

In the above mentioned example, the one Training frame may be transmitted each time. In cases where the initiator is capable of transmitting through multiple beams/sectors simultaneously, two or more Training frames may be transmitted through multiple beams/sectors each time. In other instances, one Training frame may be transmitted through multiple beams/sectors each time. The Training frame may, in one embodiment, have the format shown in FIG. 8, where TRN-R field may be appended to allow responders to train their best receive beams.

In the above-mentioned example, the FB period may be divided to multiple FB time slots. Each FB time slot may be associated with one sector or beam direction. Responders which associated with that sector or beam direction may try to feedback on that time slot, while the initiator may perform receiving using the associated sector or beam direction. A responder may use its best transmit beam, which may be trained using the TRN-R field appended in the Training frame if channel reciprocity is assumed, to feedback on that time slot.

In cases where the initiator has capability to receive through two or more receive beams simultaneously, each feedback time slot may be associated to two or more beam directions. For example, the kth FB time slot may be used for responders which may associate with sector/beam directions m and n. The initiator, in reception of FB time slot k, may use receive sectors/beams m and n correspondingly. The initiator may design the sector/beam pair carefully such that the inter-sector/beam interference at the receiver (initiator) side is small. For example, the initiator may pair beams/sectors formed through dual polarized PAAs together.

By using any or all of the above-mentioned procedures, the number of responders which may transmit in the same FB time slot may be restricted and/or limited. However, they may still contend to transmit, since more than one responder may qualify the transmission restriction. In such cases, the contention may be performed in the time or the frequency domain. For example, with time domain contention, each FB time slot may further be divided into an integer number of time chips. Each responder attempting to respond using the FB time slot may randomly select one time chip to transmit. With frequency domain contention, the wide frequency band may be divided into multiple frequency domain sub-channels. Each responder attempting to respond using the FB time slot may randomly select one sub-channel on which to transmit. Note that a responder may transmit the preamble or part of the preamble using the entire band, but data fields which may carry the FB information may be transmitted on the selected sub-channel(s). Alternatively, the FB time slot may be divided into multiple time-frequency domain grids. The responder may randomly pick one time-frequency domain unit on or at which to transmit. Again, the preamble or part of the preamble may be transmitted over the entire band. The above-mentioned FB procedures may be extended to transmit data/control information other than beamforming training related information.

Figure 11:
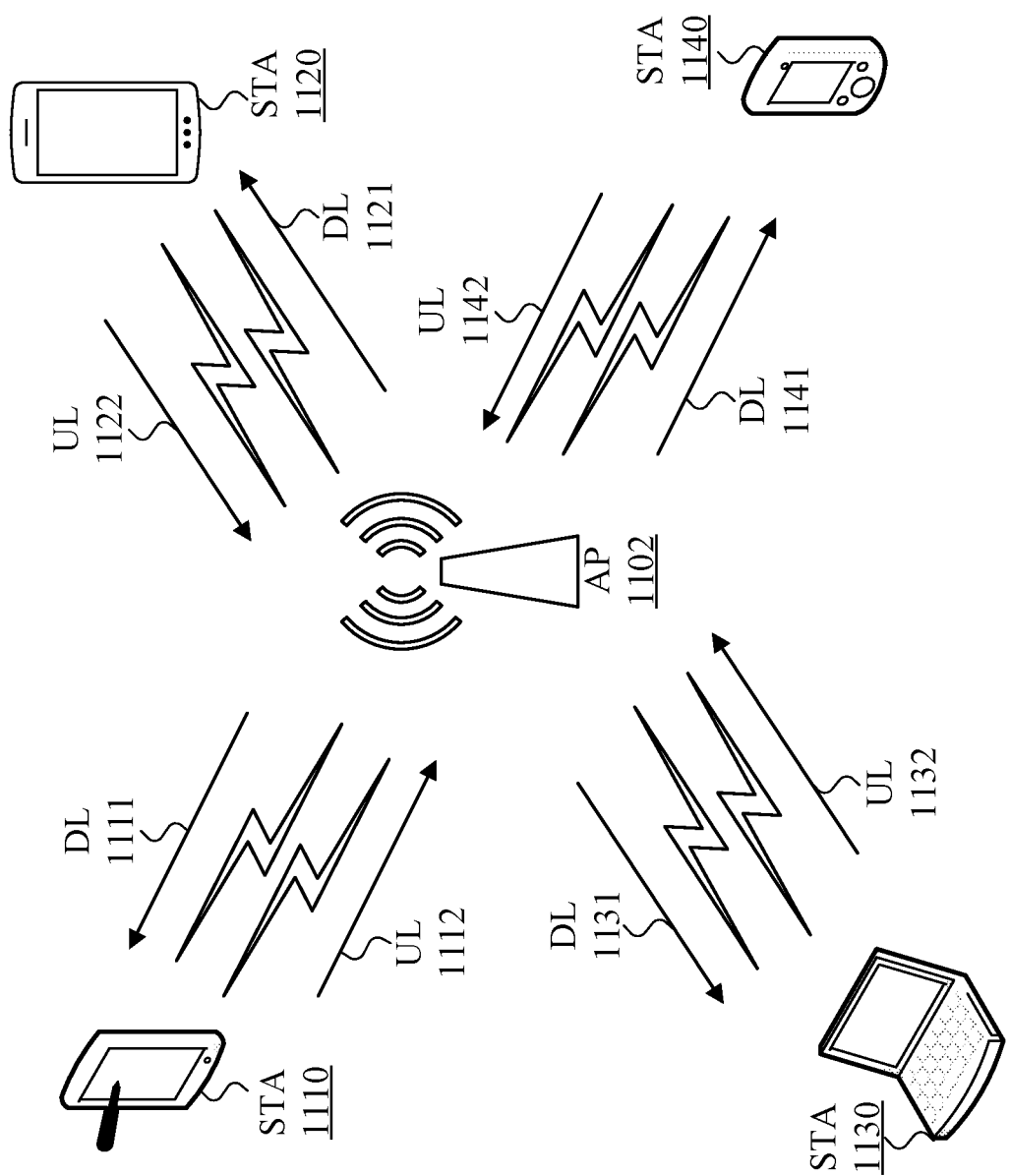
FIG. 11 depicts an example wireless-communication scenario, in accordance with at least one embodiment.

FIG. 11 depicts an example scenario that includes an AP and multiple STAs, in accordance with at least one embodiment. The example scenario 1100 includes an AP 1102, a STA 1110, a STA 1120, a STA 1130, and a STA 1140. In the depicted example, the STA 1110 is a tablet computer, the STA 1120 is a smartphone, the STA 1130 is a laptop computer, and the STA 1140 is a personal digital assistant (PDA). In the depicted example, each of the STAs 1110-1140 receive data from the AP 1102 over a DL as shown at 1111, 1121, 1131, and 1141, and each of the STAs also transmit data to the AP 1102 over an UL as shown at 1112, 1122, 1132, and 1142. The STAs 1110-1140 may communicate with the AP 1102 (and perhaps with one another) using any suitable wireless protocol, including any IEEE 802.11 protocol.

Figure 12:
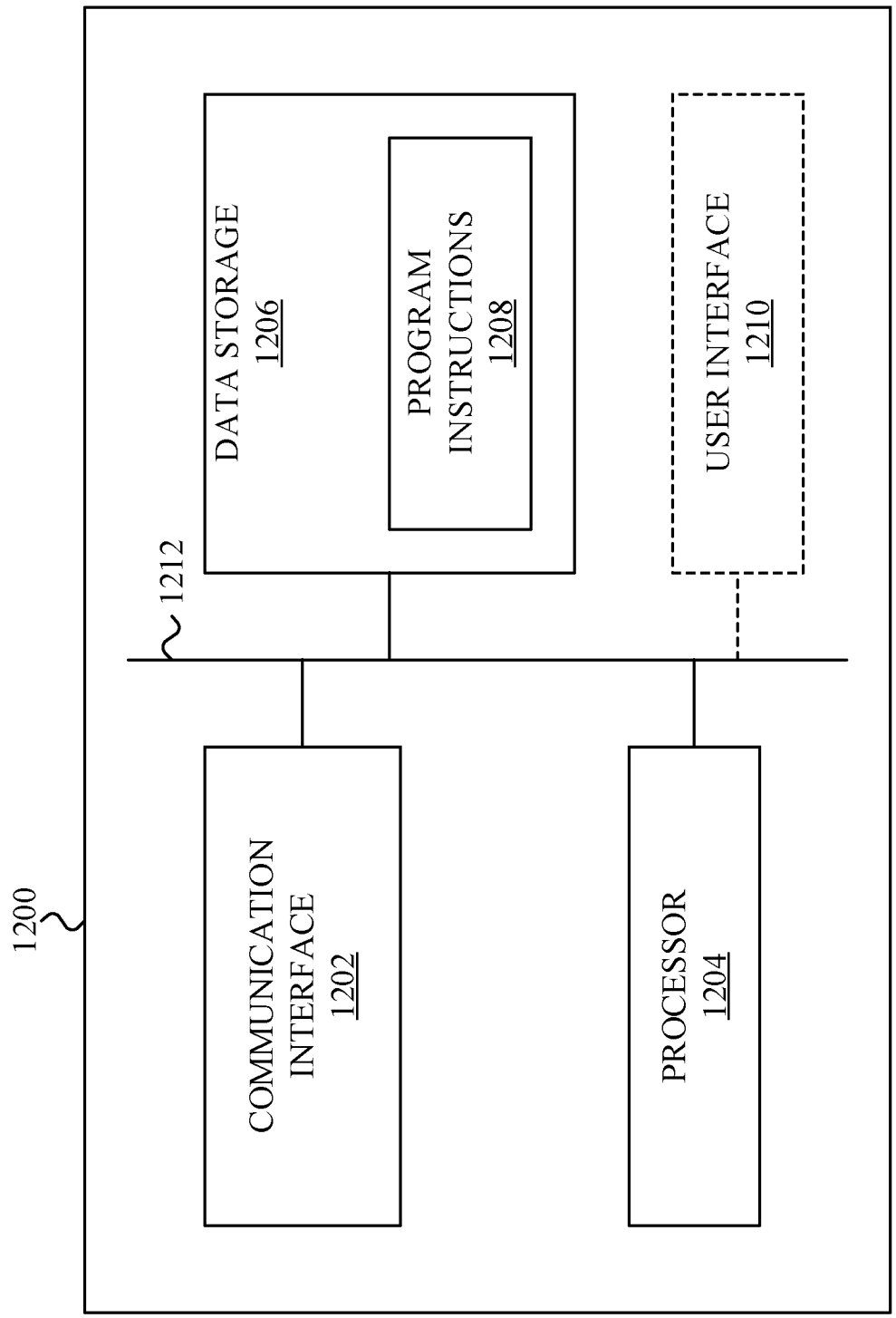
FIG. 12 depicts an example wireless-communication device, in accordance with at least one embodiment.

FIG. 12 depicts an example wireless-communication device, in accordance with at least one embodiment. The device 1200 could be an AP, a STA, and/or any other wireless-communication device. Thus, any of the APs, STAs, and/or other computing-and-communication devices described herein (e.g., the AP 1102, the STAs 1110-1140, etc.) could have a structure similar to the example structure that is described in connection with FIG. 12. Moreover, the various devices referred to herein by terms such as initiator, responder, and the like could have a structure similar to the structure described in connection with FIG. 12.

As shown in FIG. 12, the example device 1200 includes a communication interface 1202, a processor 1204, data storage 1206 containing program instructions 1208, and an optional user interface 1210, all of which are communicatively connected by a system bus 1212. Other device architectures could be used as well, as the provided and described architecture is presented herein by way of example and not limitation.

The communication interface 1202 may include one or more wireless-communication interfaces (for communicating according to, e.g., LTE, Wi Fi (i.e., any one or more IEEE 802.11 protocols), Bluetooth, and/or the like) and/or one or more wired-communication interfaces (for communicating according to, e.g., Ethernet, USB, and/or the like). As such, the communication interface 1202 may include any necessary hardware (e.g., chipsets, antennas, Ethernet cards, etc.), any necessary firmware, and any necessary software for conducting one or more forms of communication with one or more other entities as described herein.

The processor 1204 may include one or more processors of any type deemed suitable by those of skill in the relevant art, some examples including a general-purpose microprocessor and a dedicated digital signal processor (DSP).

The data storage 1206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. The data storage 1206 contains program instructions 1208 that are executable by the processor 1204 for carrying out various functions described herein.

When present, the optional user interface 1210 may include one or more input devices (a.k.a. components and the like) and/or one or more output devices (a.k.a. components and the like). With respect to input devices, the optional user interface 1210 may include one or more touchscreens, buttons, switches, knobs, microphones, and the like. With respect to output devices, the optional user interface 1210 may include one or more displays, speakers, light emitting diodes (LEDs), and the like. Moreover, one or more components (e.g., an interactive touchscreen-and-display component) of the optional user interface 1210 could provide both user-input and user-output functionality. And certainly other user-interface components could be used in a given context, as known to those of skill in the art.

Although the features and elements of the present invention are described in the preferred embodiments in particular combinations, each feature or element can be used alone without the other features and elements of the preferred embodiments or in various combinations with or without other features and elements of the present invention.

Although the embodiments described herein consider 802.11 specific protocols, it is understood that the embodiments described herein are not restricted to this scenario and are applicable to other wireless systems as well.

Throughout the embodiments and provided examples, the blank areas in the figures implies that there is no restriction for this area and any embodiment can be employed.

Additional Embodiments

In one embodiment, there is a method comprising an initiator device transmitting, to a plurality of responder devices, a message frame containing scheduling information that announces a training period and a feedback period for MIMO beamforming training; the initiator device transmitting, to the plurality of responder devices, a plurality of training frames, each frame sequentially transmitted using a respective transmit beam, during the announced training period, and each of the training frames having a plurality of training sequences appended to an end of said training frame, wherein the number of training sequences is representative of a number of receive beams of the responder devices to be trained; the initiator device sequentially receiving beamforming-feedback responses on the receive beams of the initiator to be trained, said responses received from at least a subset of the plurality of responder devices during the announced feedback period; and the initiator device transmitting, responsive to the received beamforming-feedback responses, one or more acknowledgement frames to the subset of the plurality of responder devices. The method may include wherein the initiator device sequentially receives on each receive beam to be trained for one of a plurality of time slots within the announced feedback period. The method may include wherein within at least one of the plurality of time slots the initiator device receives beamforming-feedback responses from each of a plurality of the responder devices. The method may include wherein the initiator device sequentially receives on the receive beams during the feedback period in a same order as used in the training period. The method may further comprise the initiator device communicating at least one restricted random access rule indicating requirements for the plurality of responder devices to transmit beamforming-feedback responses during each of the plurality of time slots. The method may further comprise the initiator device communicating to the plurality of responder devices instructions for time domain contention across a within each of the plurality of time slots. The method may include wherein the instructions direct responder devices to transmit their beamforming-feedback responses in a randomly selected one of a plurality of time chips within a time slot for which said responder device meets the response requirements. The method may further comprise the initiator device communicating to the plurality of responder devices instructions for frequency domain contention within each of the plurality of time slots. The method may include wherein the instructions direct responder devices to transmit their beamforming-feedback responses on a randomly selected one of a plurality of frequency domain sub-channels within a time slot for which said responder device meets the response requirements. The method may include wherein each training frame includes a PLCP header that indicates (i) a basic service set ID that identifies one or both of the initiator device and a corresponding basic service set and (ii) a number of extra training sequences appended to an end of the training frame.

In one embodiment, there may be a method comprising an initiator device transmitting, to one or more responder devices, a beacon frame that includes scheduling information that announces a training period and a feedback period for MIMO beamforming. The method may also comprise the initiator device transmitting, to the one or more responder devices, a number N of training frames during the announced training period. The method may also comprise the initiator device receiving beamforming-feedback responses from the responder devices during the announced feedback period. The method may also comprise the initiator device transmitting one or more acknowledgement frames to the one or more responder devices during an acknowledgement period that occurs after the feedback period. In some instances, the scheduling information comprises a starting time and duration of the MIMO beamforming training and feedback period. In some instances, the scheduling information comprises a time offset relative to the beacon frame. In some instances, each training frame is transmitted using a sector/beam/antenna vector weight (AVW). In some instances, the training frames are separated by an xIFS period. In some instances, each training frame includes a PLCP header that indicates (i) a BSSID/Color that identifies one or both of the initiator device and a corresponding basic service set (BSS) and (ii) a number K of extra AGC/training sequences appended to an end of the training frame. In some instances, each training frame includes a MAC body that contains one or more of a duration, a sector/beam/antenna vector weight (AVW) ID, feedback-preference information, and acknowledgement information. In some instances, each training frame is coded and modulated using a lowest MCS level. In some instances, the initiator device receiving beamforming-feedback responses from the responder devices during the announced feedback period comprises the initiator device receiving multiple feedback frames in multiple respective time slots. In some instances, the feedback period is a feedback period without polling. In some instances, the responders utilize random access to transmit the feedback responses. In some instances, the responders utilize restricted random access to transmit the feedback responses. In some instances, the initiator repeats sector/beam sweep in the same order as in the training period while the responder(s) respond in the best sector trained in the training period. In some instances, the responders utilize scheduled access to transmit the feedback responses. In some instances, the feedback period is a feedback period with polling. In some instances, the responders utilize random access to transmit the feedback responses. In some instances, the responders utilize scheduled access to transmit the feedback responses. In some instances, each feedback time slot begins with a polling frame transmitted from the initiator device. In some instances, each polling frame is transmitted using a quasi-Omni weight. In some instances, each polling frame is transmitted using a lowest MCS. In some instances, each feedback time slot other than the first feedback time slot begins with a polling frame transmitted from the initiator device. In some instances, the feedback period is used to carry acknowledgement from the initiator device. In some instances, the initiator device transmits a multi-station-acknowledgment frame to multiple responder devices. In some instances, the multi-station-acknowledgement frame is transmitted using a quasi-Omni weight. In some instances, the multi-station-acknowledgement frame is transmitted using a lowest MCS. In some instances, the initiator device repeats the multi-station-acknowledgement frame in the time domain. In some instances, the initiator device repeats the multi-station-acknowledgement frame in the frequency domain. In some instances, the initiator device repeats the multi-station-acknowledgement frame in both the time domain and the frequency domain. In some instances, the initiator device transmits respective acknowledgement frames to multiple different responders. In some instances, the respective acknowledgement frames are separated by an xIFS time period. In some instances, each such acknowledgement frame is transmitted using a best sector/beam/antenna vector weight (AVW) that is selected based on feedback received during the feedback period. In some instances, the initiator transmits an acknowledgement-announcement frame after an end of the feedback frame. In some instances, after comprises an xIFS time after. In some instances, the acknowledgement-announcement frame is transmitted using a quasi-Omni weight. In some instances, the acknowledgement-announcement frame is transmitted using a lowest MCS.

In one embodiment, there is an initiator device comprising: a wireless-communication interface; a processor; and data storage containing instructions executable by the processor for causing the initiator device to carry out a set of functions, the set of functions including: transmitting, to one or more responder devices, a beacon frame that includes scheduling information that announces a training period and a feedback period for MIMO beamforming; transmitting, to the one or more responder devices, a number N of training frames during the announced training period; receiving beamforming-feedback responses from the responder devices during the announced feedback period; and transmitting one or more acknowledgement frames to the one or more responder devices during an acknowledgement period that occurs after the feedback period.

In one embodiment, there is a unified multicast/broadcast multiple-in-multiple-out (MIMO) beamforming training procedure, which includes: a training period in which an initiator transmits multiple unified training frames for performing a transmit-beamforming training of the initiator and a receive-beamforming training of one or more responders; a training-feedback period in which each responder replies with a training-feedback frames; and an acknowledgement period during which the initiator transmits respective acknowledgement frames to the one or more responders. In some instances, each responder transmits a training-feedback frame using one of a random access, a scheduled access, and a poll-based access.

In one embodiment, there is a beamforming training procedure comprising: transmitting from an initiator, multiple unified training frames (UTF) during a training period having a plurality of time slots, wherein at least one time slot includes simultaneous UTF transmissions over separate beams. In some instances, the procedure further comprises receiving training feedback frames during a training-feedback period from a plurality of responders. In some instances, the FB period is divided into multiple FB time slots, wherein each FB time slot is associated with one sector or beam direction. In some instances, the FB period is divided into multiple FB time slots, wherein each FB time slot is associated with two or more beam directions. In some instances, the two or more beam directions are selected to reduce an inter-sector/beam interference at an initiator receiver. In some instances, the initiator forms pairs of beams and/or sectors through dual polarized PAAs. In some instances, a given FB time slot is restricted/limited, and contention is performed in either a time or frequency domain. In some instances, a time domain contention comprises dividing each FB time slot into an integer number of time chips, and wherein each responder contending for that FB slot randomly selects one time chip during which to transmit. In some instances, a frequency domain contention comprises dividing the wide frequency band into multiple frequency domain sub-channels, and wherein each responder contending to use a given FB time slot randomly selects one sub-channel to transmit. In some instances, a responder transmits a preamble or part of the preamble using the entire band, and transmits a data field carrying FB information is transmitted on the selected sub-channel. In some instances, the FB time slot is divided into multiple time-frequency domain grids. In some instances, a responder randomly picks one time-frequency domain unit to transmit. In some instances, the responder transmits a preamble or part of the preamble over the entire band.

In one embodiment, there is a method comprising an initiator device transmitting, to one or more responder devices, a beacon frame that includes scheduling information that announces a training period and a feedback period for MIMO beamforming. The method also includes the initiator device transmitting, to the one or more responder devices, a number N of training frames during the announced training period. The method also includes the initiator device receiving beamforming-feedback responses from the one or more responder devices during the announced feedback period. The method also includes the initiator device transmitting one or more acknowledgement frames to the one or more responder devices. The method may include wherein the scheduling information comprises a starting time and duration of the MIMO beamforming training and feedback period. The method may include wherein the scheduling information comprises a time offset relative to the beacon frame. The method may include wherein each training frame is transmitted using a sector, a beam, or an antenna vector weight (AVW). The method may include wherein the initiator device transmitting the training frames further comprises the initiator device concurrently transmitting a plurality of training frames using a plurality of sectors, beams, or antenna vector weights. The method may include wherein the training frames are separated by an xIFS period. The method may include wherein each training frame includes a PLCP header that indicates (i) a basic service set ID that identifies one or both of the initiator device and a corresponding basic service set and (ii) a number K of extra training sequences appended to an end of the training frame. The method may include wherein each training frame includes a MAC body that contains one or more of: a duration; a sector ID, a beam ID, or an antenna vector weight ID; feedback-preference information; and acknowledgement information. The method may include wherein the number N is indicated in each training frame. The method may include wherein a remaining number of training frames is indicated in each training frame. The method may include wherein the initiator device receiving beamforming-feedback responses from the responder devices during the announced feedback period comprises the initiator device receiving multiple feedback frames in multiple respective time slots. The method may include wherein the length of each time slot is the same. The method may include wherein not all of the time slots have the same length. The method may include wherein the feedback period is a feedback period without polling. The method may further comprise announcing, from the initiator device, random access for at least one time slot in which the one or more responder devices may respond. The method may include wherein the random access announcement from the initiator device further comprises announcement of restricted random access for at least one of the at least one time slot. The method may further comprise wherein the beamforming-feedback responses from the one or more responder devices are scheduled by the initiator device. The method may include wherein the feedback period is a feedback period with polling. The method may further comprise announcing, from the initiator device, random access for at least one time slot in which the one or more responder devices may respond. The method may include wherein the random access announcement from the initiator device further comprises announcement of restricted random access for at least one of the at least one time slot. The method may further comprise wherein the beamforming-feedback responses from the one or more responder devices are scheduled by the initiator device. The method may include wherein each feedback time slot begins with a polling frame transmitted from the initiator device. The method may include wherein each polling frame is transmitted using a quasi-Omni weight. The method may include wherein each polling frame is transmitted using a lowest MCS. The method may include wherein each feedback time slot other than the first feedback time slot begins with a polling frame transmitted from the initiator device. The method may include wherein the initiator device transmits the one or more acknowledgment frames to the one or more responder devices during an acknowledgement period that occurs after the feedback period. The method may include wherein the one or more acknowledgment frames comprises a multi-station acknowledgment frame to a plurality of the one or more responder devices. The method may include wherein the multi-station acknowledgement frame is transmitted using a quasi-omni weight. The method may include wherein the multi-station acknowledgement frame is transmitted using a lowest MCS. The method may include wherein the initiator device repeats the multi-station acknowledgement frame in the time domain. The method may include wherein the initiator device repeats the multi-station acknowledgement frame in the frequency domain. The method may include wherein the initiator device repeats the multi-station acknowledgement frame in both the time domain and the frequency domain. The method may include wherein the initiator device transmits respective acknowledgement frames to multiple different responders. The method may include wherein the respective acknowledgement frames are separated by an xIFS time period. The method may include wherein each such acknowledgement frame is transmitted using a best sector, a best beam, or a best antenna vector weight (AVW) that is selected based on beamforming-feedback responses received during the feedback period. The method may include wherein the initiator device transmits an acknowledgement-announcement frame after an end of the feedback frame. The method may include wherein the acknowledgment-announcement frame is transmitted xIFS time after an end of the feedback frame. The method may include wherein the acknowledgement-announcement frame is transmitted using a quasi-Omni weight. The method may include wherein the acknowledgement-announcement frame is transmitted using a lowest MCS. The method may include wherein the initiator device transmits the one or more acknowledgment frames to the one or more responder devices during the feedback period, subsequent to successful decoding of beamforming-feedback responses. The method may further comprise the initiator device transmitting a training announcement frame. The method may include wherein the training announcement frame includes a length of a transmission opportunity. The method may include wherein the training announcement frame includes at least one of a time allocation and a frequency allocation for the announced training period. The method may include wherein the training announcement frame includes at least one of a time allocation and a frequency allocation for the announced feedback period. The method may include wherein the training announcement frame includes at least one of a time allocation and a frequency allocation for an acknowledgment period.

In one embodiment, there is a method comprising an initiator device transmitting, to one or more responder devices, a training announcement frame that includes scheduling information that announces a training period and a feedback period for MIMO beamforming. The method also includes the initiator device transmitting, to the one or more responder devices, a number N of training frames during the announced training period. The method also includes the initiator device receiving beamforming-feedback responses from the one or more responder devices during the announced feedback period. The method also includes the initiator device transmitting one or more acknowledgement frames to the one or more responder devices.

In one embodiment, there is a method comprising a responder device receiving, from an initiator device, a beacon frame that includes scheduling information that announces a training period and a feedback period for MIMO beamforming. The method also includes the responder device receiving, from the initiator device, at least one training frame during the announced training period. The method also includes the responder device transmitting a beamforming-feedback response to the initiator device during the announced feedback period. The method also includes the responder device receiving at least one acknowledgment frame from the initiator device. The method may further comprise the responder device determining, based on a received training frame, a number K of extra training sequences appended to an end of said training frame. The method may further comprise, responsive to a determination that the number K is greater than or equal to a number of receiving sectors, beams, or antenna vector weights (AVWs) to be trained, the responder device switching its receiving sectors, beams, or AVWs over all possible combinations. The method may further comprise wherein if the number K is greater than the number of receiving sectors, beams, or AVWs to be trained, the responder device repeating at least one of the receiving sectors, beams, or AVWs to be trained in the at least one extra training sequence. The method may further comprise, responsive to a determination that the number K is less than a number of receiving sectors, beams, or antenna vector weights (AVWs) to be trained, the responder device selecting K receiving sectors, beams, or AVWs for training. The method may include wherein the K sectors, beams, or AVWs are selected based at least in part on a training history of the responder device. The method may further comprise the responder device estimating a length of the training period. The method may further comprise the responder device preparing the beamforming-feedback response based on a type of the announced feedback period. The method may further comprise wherein the announced feedback period is random access feedback without polling, the responder device selecting a time slot to transmit the beamforming-feedback response using a random access protocol. The method may further comprise wherein the announced feedback period is scheduled feedback without polling, the responder device transmitting the beamforming-feedback response at the beginning of a scheduled time slot. The method may further comprise wherein the announced feedback period is random access feedback with polling. The method may further comprise wherein the announced feedback period is scheduled feedback with polling, responsive to the responder device receiving a polling frame, the responder device transmitting the beamforming-feedback response xIFS period after the polling frame. The method may include wherein the received at least one acknowledgment frame comprises a multi-station acknowledgment frame.

In one embodiment, there is a method comprising an initiator device transmitting, to one or more responder devices, scheduling information that announces a training period and a feedback period for MIMO beamforming. The method also includes the initiator device transmitting, to the one or more responder devices, a number N of training frames during the announced training period. The method also includes the initiator device receiving beamforming-feedback responses from the one or more responder devices during the announced feedback period. The method also includes the initiator device transmitting one or more acknowledgement frames to the one or more responder devices. The method may include wherein the scheduling information is transmitted in a beacon frame. The method may include wherein the scheduling information is transmitted in a training announcement frame.

In one embodiment, there is a method, comprising transmitting, from an initiator device to a plurality of responder devices, a message frame containing training period scheduling information announcing a training period and a feedback period for MIMO beamforming. The method also includes transmitting, from the initiator device, at least N training frames through N beams during the announced training period. The method also includes receiving, at the initiator device, at least one feedback transmission from at least one of the plurality of responder devices, each of the at least one feedback transmission identifying a preferred beam for the responder device associated with the feedback transmission. The method also includes transmitting, from the initiator device, at least a first acknowledgement frame to the at least one of the plurality of responder devices. The method may include wherein the first acknowledgment frame is transmitted during an acknowledgment period, wherein the acknowledgment period occurs after the feedback period. The method may include wherein the first acknowledgment frame is transmitted during the feedback period. The method may include wherein the feedback transmissions are coordinated by the initiator device according to polling. The method may include wherein the feedback transmissions are coordinated by the initiator device according to predetermined scheduling. The method may include wherein the feedback transmissions are coordinated by the initiator device according to random access. The method may include wherein the feedback transmissions are coordinated by the initiator device according to contention.

What is claimed is:

1. A method, implemented by an initiator device, the method comprising:

sending, by the initiator device to a plurality of responder devices, one or more frames including scheduling information that announces a feedback period, the one or more frames including at least one training field, each respective training field including a plurality of training subfields positioned at an end of a respective frame of the one or more frames;

receiving, by the initiator device from a first responder device of the plurality of responder devices, a beamforming-feedback response during a feedback period time slot in the announced feedback period, wherein the announced feedback period is a contention-based feedback period such that the first responder device and at least one other responder device can have contending beamforming-feedback responses during the feedback period time slot within the announced feedback period; and sending, by the initiator device to the first responder device, at least one acknowledgment frame.

2. The method of claim 1, further comprising receiving, by the initiator device from the first responder device, the beamforming-feedback response in the feedback period time slot based on information provided in the respective frame.

3. The method of claim 2, wherein the beamforming-feedback response is any one of: (1) received in one of a plurality of time chips within the feedback period time slot;

(2) received in one of a plurality of time-spatial chips within the feedback period time slot; or (3) received in one of a plurality of frequency domain sub-channels in the feedback period time slot.

4. The method of claim 1, wherein the beamforming-feedback response is received after a polling frame sent from the initiator device.

5. The method of claim 1, wherein the one or more frames sent by the initiator device are addressed to more than one of the plurality of responder devices.

6. The method of claim 1, further comprising:
sending, by the initiator device to the first responder device, information using a changed transmit beam; and
receiving, by the initiator device, one or more unsolicited frames indicating unsolicited feedback information in accordance with the changed transmit beam.

7. The method of claim 1, further comprising sending, by the initiator device, each frame sequentially using a respective transmit beam of a plurality of transmit beams.

8. The method of claim 1, wherein a number of training subfields of the respective training field corresponds to a number of receive beams of the plurality of responder devices to be trained.

9. The method of claim 1, further comprising determining, by the initiator device, based on the beamforming-feedback response, any of: (1) a receive beam of a plurality of receive beams of the initiator device for communication with the first responder device; or (2) a transmit beam of a plurality of transmit beams of the initiator device for communication with the first responder device.

10. An initiator device, comprising:
a transmit/receive unit configured to:
send, to a plurality of responder devices, one or more frames including scheduling information that announces a feedback period, the one or more frames including at least one training field, each respective training field including a plurality of training subfields positioned at an end of a respective frame of the one or more frames;
receive, from a first responder device of the plurality of responder devices, a beamforming-feedback response during a feedback period time slot in the announced feedback period, wherein the announced feedback period is a contention-based feedback period such that the first responder device and at least one other responder device can have contending beamforming-feedback responses during the feedback period time slot within the announced feedback period; and
send, by the initiator device to the first responder device, at least one acknowledgment frame.

11. The initiator device of claim 10, wherein the transmit/receive unit is configured to receive, from the first responder device, the beamforming-feedback response in the feedback period time slot based on information provided in the respective frame.

12. The initiator device of claim 11, wherein the beamforming-feedback response is any one of: (1) received in one of a plurality of time chips within the feedback period time slot; (2) received in one of a plurality of time-spatial chips within the feedback period time slot; or (3) received in one of a plurality of frequency domain sub-channels in the feedback period time slot.

13. The initiator device of claim 10, wherein the beamforming-feedback response is received after a polling frame sent from the initiator device.

14. The initiator device of claim 10, wherein the one or more frames are addressed to more than one of the plurality of responder devices.

15. The initiator device of claim 10, wherein the transmit/receive unit is configured to:
send, to the first responder device, information using a changed transmit beam; and
receive one or more unsolicited frames indicating unsolicited feedback information in accordance with the changed transmit beam.

16. The initiator device of claim 10, wherein the transmit/receive unit is configured to send each frame sequentially using a respective transmit beam of a plurality of transmit beams.

17. The initiator device of claim 10, wherein a number of training subfields of the respective training field corresponds to a number of receive beams of the plurality of responder devices to be trained.

18. The initiator device of claim 10, further comprising a processor configured to determine, based on the received beamforming-feedback response, any of:
(1) a receive beam of a plurality of receive beams of the initiator device for communication with the first responder device; or (2) a transmit beam of a plurality of transmit beams of the initiator device for communication with the first responder device.

* * * * *